US010976187B2

(12) United States Patent
Hoffmann et al.

(10) Patent No.: US 10,976,187 B2
(45) Date of Patent: Apr. 13, 2021

(54) DISASTER RESPONSE SYSTEM AND METHOD

(71) Applicant: Venti, LLC, New Bern, NC (US)

(72) Inventors: Edward Wendell Hoffmann, New Bern, NC (US); Melanie Rae McTaggart, New Bern, NC (US); Daniel Cecil Seely, Haymarket, VA (US)

(73) Assignee: VENTI, LLC, New Bern, NC (US)

( * ) Notice: Subject to any disclaimer, the term of this patent is extended or adjusted under 35 U.S.C. 154(b) by 136 days.

(21) Appl. No.: 15/915,234

(22) Filed: Mar. 8, 2018

(65) Prior Publication Data

US 2019/0094051 A1  Mar. 28, 2019

Related U.S. Application Data

(63) Continuation-in-part of application No. PCT/US2016/043298, filed on Jul. 21, 2016.
(Continued)

(51) Int. Cl.
*G01D 11/24* (2006.01)
*H02J 7/02* (2016.01)
(Continued)

(52) U.S. Cl.
CPC .......... *G01D 11/245* (2013.01); *H02J 7/025* (2013.01); *H02J 50/10* (2016.02); *H04B 5/0037* (2013.01);
(Continued)

(58) Field of Classification Search
CPC ......... G01D 11/245; H02J 50/10; H02J 7/025
See application file for complete search history.

(56) References Cited

U.S. PATENT DOCUMENTS 8,110,808 B2  2/2012  Frank
9,251,698 B2  2/2016  Vian et al.
(Continued)

FOREIGN PATENT DOCUMENTS

WO    WO 2015/113962 A1    8/2015

OTHER PUBLICATIONS

International Search Report and Written Opinion dated Oct. 6, 2016 in PCT Application PCT/US2016/43298.
International Preliminary Report on Patentability dated Jan. 18, 2018 in PCT Application PCT/US2016/43298.

*Primary Examiner* — Paul M. West
(74) *Attorney, Agent, or Firm* — Nixon & Vanderhye P.C.

(57) ABSTRACT

A probe is configured for introduction into a vicinity of a hazard. The probe comprises multiple sensors, communications circuitry, processor circuitry, and a casing. The multiple sensors include at least: a sensor configured to acquire disposition information of the probe; and a sensor configured to acquire environmental information in a vicinity of the probe. The communications circuitry is configured to transmit the disposition information and the environmental information externally to the probe. The processor circuitry is configured to coordinate operation of the multiple sensors and the communications circuitry. The casing is configured to internally house the multiple sensors, the transmitter, and the processor circuitry. The casing comprises an essentially cylindrical bullet shape, and wherein along a major cylindrical axis a first end of the casing comprises a flat butt surface and a second end of the casing comprises a rounded nose surface.

16 Claims, 22 Drawing Sheets

Related U.S. Application Data

(60) Provisional application No. 62/469,383, filed on Mar. 9, 2017, provisional application No. 62/222,041, filed on Sep. 22, 2015, provisional application No. 62/222,499, filed on Sep. 23, 2015.

(51) Int. Cl.
*H02J 50/10* (2016.01)
*H04B 5/00* (2006.01)
*H04Q 9/02* (2006.01)
*H04Q 9/00* (2006.01)
*H04B 1/034* (2006.01)

(52) U.S. Cl.
CPC ............ *H04B 5/0093* (2013.01); *H04Q 9/00* (2013.01); *H04Q 9/02* (2013.01); *H04B 1/034* (2013.01); *H04Q 2209/43* (2013.01); *H04Q 2209/826* (2013.01); *H04Q 2209/84* (2013.01); *H04Q 2209/88* (2013.01)

(56) References Cited

U.S. PATENT DOCUMENTS

| | | |
|---|---|---|
| 2003/0151489 A1 | 8/2003 | Shbiro et al. |
| 2004/0012491 A1 | 1/2004 | Kulesz et al. |
| 2005/0253709 A1 | 11/2005 | Baker |
| 2006/0021950 A1 | 2/2006 | Crandall et al. |
| 2006/0059512 A1 | 3/2006 | Pugel |
| 2007/0080863 A1 | 4/2007 | Glockler et al. |
| 2009/0029716 A1 | 1/2009 | Thomas |
| 2009/0075704 A1* | 3/2009 | Wang ............... H02J 50/10 455/573 |
| 2009/0299694 A1 | 12/2009 | Frank |
| 2010/0268519 A1 | 10/2010 | Henning et al. |
| 2011/0050461 A1 | 3/2011 | Pixley et al. |
| 2014/0299757 A1 | 10/2014 | Akers et al. |
| 2015/0248275 A1 | 9/2015 | Gallo et al. |
| 2015/0285638 A1 | 10/2015 | Funk et al. |

\* cited by examiner

Fig. 2A
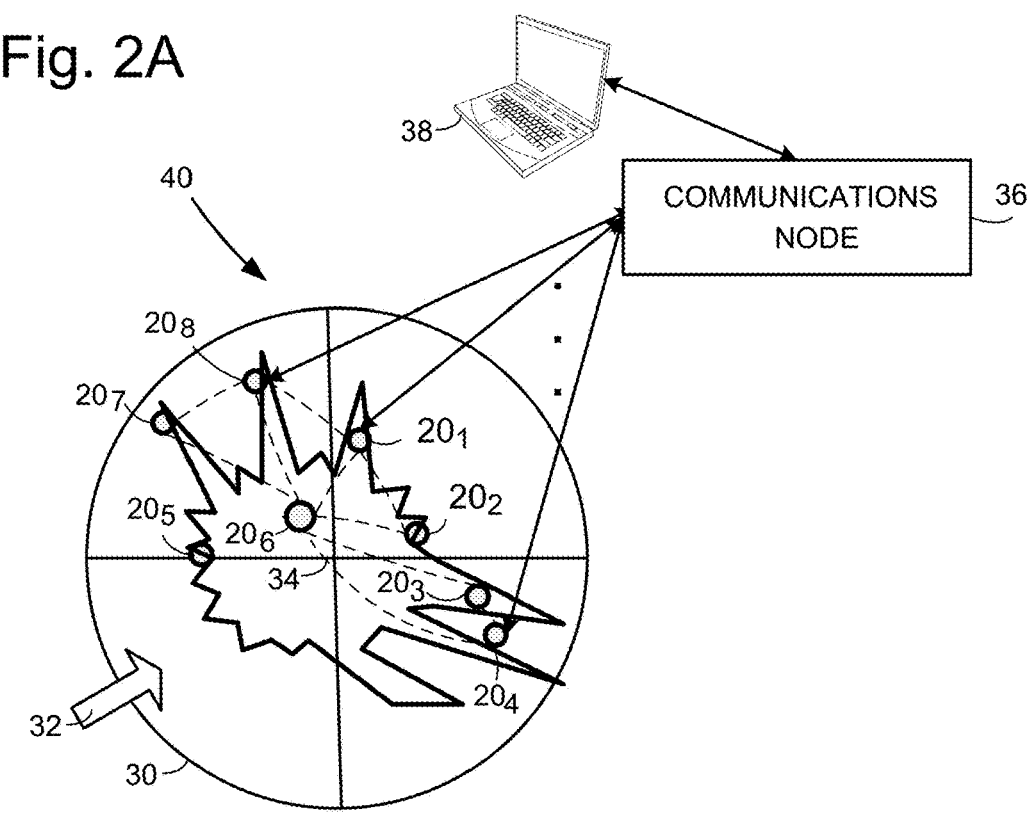
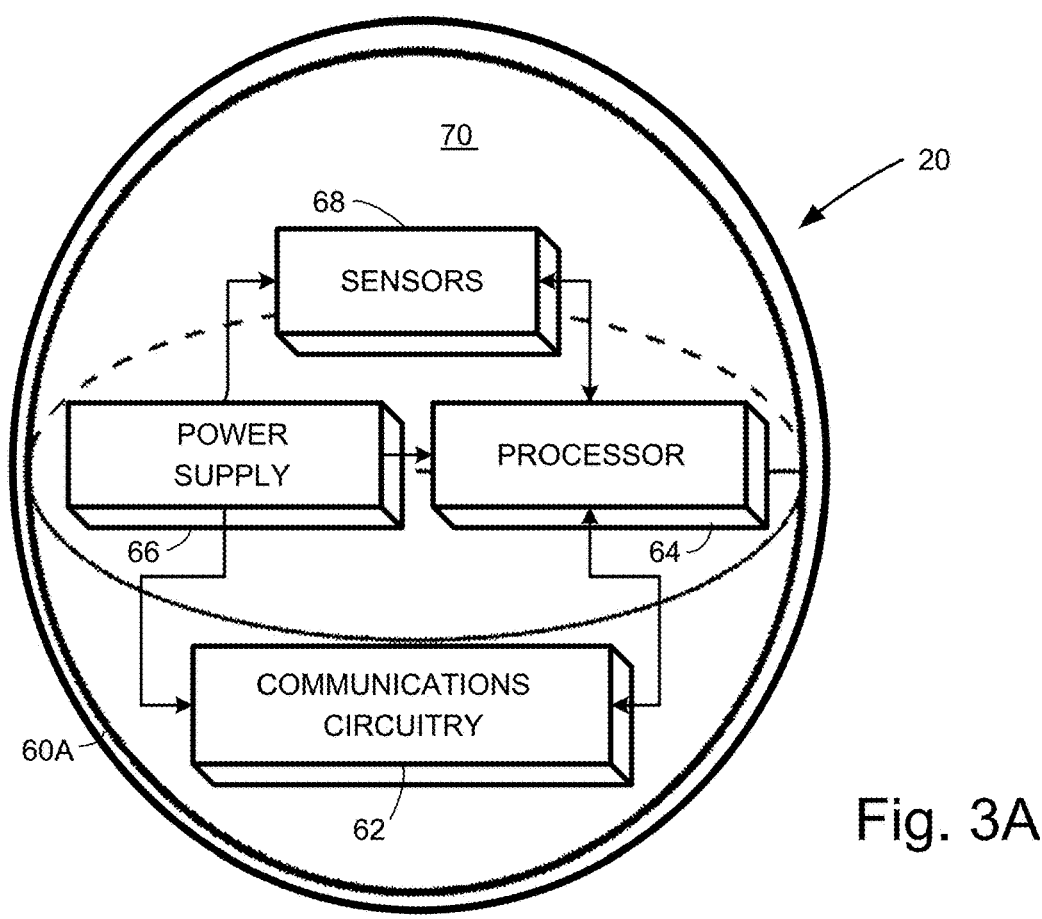
Fig. 3A

Continuous Real-Time Display and Alerting of Remote GeoSpatial, Sensor Location, Velocity and Environmental Data Continuous Hazard Prediction and Alerting from Remote GeoSpatial, Sensor Location, Velocity and Environmental Data and Models

DISASTER RESPONSE SYSTEM AND METHOD

This patent application is a continuation-in-part of PCT Patent Application PCT/US2016/043298, filed Jul. 21, 2016, entitled "DISASTER RESPONSE SYSTEM AND METHOD", and claims the priority and benefit of the following (all of which are incorporated herein by reference in their entirety):

PCT Patent Application PCT/US2016/043298, entitled "DISASTER RESPONSE SYSTEM AND METHOD";

U.S. Provisional Patent Application 62/222,041, filed Sep. 22, 2015, entitled "A Disaster Response System that identifies and provides real time analysis for micro HAZMAT environments";

U.S. Provisional Patent Application 62/222,499, filed Sep. 23, 2015, entitled "Re-configurable micro sensor that can be employed to detect weather and hazardous material environments"; and U.S. Provisional Patent Application 62/469,383, filed Mar. 9, 2017, entitled "DISASTER RESPONSE SYSTEM AND METHOD".

BACKGROUND

First responders to hazards, whether natural or man-made, face a multitude of unknown threats and need very specific environmental and substance information to successfully handle the emergency. For example, large fires are typically chaotic in nature, with unpredictable wind shifts which endanger fire fighters and equipment. Chemical content of fires is largely unknown—presenting dangers to fire fighters and other first responders. Hazards may occur in either remote or urban environments, each of which may present complex and dangerous challenges.

SUMMARY

A bullet shaped probe has both shape and size to permit installation of an electronic sensor assembly. The probe can be manufactured from multiple materials, is water proof and permits easy turn on and off of the device without disassembly. A flat end to the probe facilitates inclusion of inductive charging plate for re-charging of an internal battery, without having to disassemble of the probe or provide for an open charging port. The probe shell or casing is designed to embed a thermocouple to permit the internal temperature sensor to directly sample of the outside environment for a more accurate sensing of potential temperature anomalies. The aerodynamic qualities of this shape also greatly aid in the range at which the probe can be projected, thereby increasing the distance and associated safety factor for first responder personnel. The probe design greatly assists in guaranteeing a continuous flow of information from the sensor units to the control station without exposing a human to danger or having to depend on pre-located sensors (which might not be correctly situated to provide useful information).

In one of its example aspects the technology disclosed herein concerns a probe configured for introduction into a vicinity of a hazard. In an example embodiment and mode the probe comprises multiple sensors, communications circuitry, processor circuitry, and a casing. The multiple sensors include at least: a sensor configured to acquire disposition information of the probe; and a sensor configured to acquire environmental information in a vicinity of the probe. The communications circuitry is configured to transmit the disposition information and the environmental information externally to the probe. The processor circuitry is configured to coordinate operation of the multiple sensors and the communications circuitry. The casing is configured to internally house the multiple sensors, the transmitter, and the processor circuitry. The casing comprises an essentially cylindrical bullet shape, and wherein along a major cylindrical axis a first end of the casing comprises a flat butt surface and a second end of the casing comprises a rounded nose surface.

In an example embodiment and mode the casing is comprised of hazard-hardened material configured to withstand the hazard for at least a predetermined time.

In an example embodiment and mode the casing is configured to be aerially projected into the hazard.

In an example embodiment and mode the casing is configured to be transported by a force of the hazard after introduction into the hazard.

In an example embodiment and mode the casing comprises a casing base section and a casing nose section which mates with the casing base section, the casing base section comprising the flat butt surface and the casing nose section comprising the rounded nose surface.

In an example embodiment and mode the casing base section comprises a three dimensional quadrilateral cavity sized to accommodate the multiple communications sensors, the processing circuitry, and the communications circuitry.

In an example embodiment and mode the casing comprises a port which accommodates a thermocouple, the thermocouple being connected to the processing circuitry internal to the casing.

In an example embodiment and mode the probe further comprises: a chargeable battery; an internal inductive charging circuit electrically coupled to and configured to charge the chargeable battery; and the casing comprises an internal three dimensional cavity sized to accommodate at least the rechargeable battery and the internal inductive charging circuit.

In an example embodiment and mode the internal inductive charging circuit is situated at an end of the cavity proximate the butt end surface of the casing.

In an example embodiment and mode the internal inductive charging circuit comprises an essentially flat inductive charging plate positioned proximate a flat internal wall of the cavity that is perpendicular to the cylindrical axis of the casing.

In an example embodiment and mode a thickness of the casing between the butt end surface of the casing and the inductive charging circuit is chosen to facilitate both a degree of hazard resistance and to permit inductive charging of the battery by combined operation of an external inductive charging circuit positioned proximate the butt end surface but external to the casing and the internal inductive charging circuit.

In another of its aspects the technology disclosed herein concerns a probe configured for introduction into a vicinity of a hazard. The probe comprises multiple sensors, communications circuitry, processor circuitry, a chargeable battery, an internal inductive charging circuit, and a casing. The multiple sensors include at least: a sensor configured to acquire disposition information of the probe; and a sensor configured to acquire environmental information in a vicinity of the probe. The communications circuitry is configured to transmit the disposition information and the environmental information externally to the probe. The processor circuitry is configured to coordinate operation of the multiple sensors and the communications circuitry. The internal inductive charging circuit is electrically coupled to and configured to charge the chargeable battery. The casing is configured to internally house the multiple sensors, the transmitter, the processor circuitry, the chargeable battery, and the internal inductive charging circuit. The casing comprises an exterior surface configured to abut an external inductive charging circuit and thereby permit inductive charging of the chargeable battery by combined operation of the internal inductive charging circuit and the external inductive charging circuit.

In an example embodiment and mode the casing comprises an essentially cylindrical bullet shape, and wherein along a major cylindrical axis a first end of the casing comprises a flat butt surface and a second end of the casing comprises a rounded nose surface, and wherein the exterior surface configured to abut the external inductive charging circuit is the flat butt surface of the casing.

In an example embodiment and mode the casing comprises an internal three dimensional cavity sized to accommodate at least the rechargeable battery and the internal inductive charging circuit, and wherein the internal inductive charging circuit is situated at an end of the cavity proximate the butt end surface of the casing.

In an example embodiment and mode the internal inductive charging circuit comprises an essentially flat inductive charging plate positioned proximate a flat internal wall of the cavity that is perpendicular to the cylindrical axis of the casing.

In an example embodiment and mode a thickness of the casing between the butt end surface of the casing and the inductive charging circuit is chosen to facilitate both a degree of hazard resistance and to permit inductive charging of the battery by the combined operation of the external inductive charging circuit and the internal inductive charging circuit.

In another of its example aspects the technology disclosed herein concerns a storage case for hazard sensor probes. The storage case comprises plural walls for defining a cavity configured to accommodate plural aerially projectable probes. At least one of the walls is configured to accommodate an inductive charging circuit configured to electromagnetically couple with a cooperating inductive charging circuit internally housed in one or more of the plural probes.

In another of its example aspects the technology disclosed herein concerns a vehicle for transporting hazard sensor probes, the vehicle comprising a storage case. The storage case comprises plural walls for defining a cavity configured to accommodate plural aerially projectable probes. At least one of the walls is configured to accommodate an inductive charging circuit configured to electromagnetically couple with a cooperating inductive charging circuit internally housed in one or more of the plural probes

BRIEF DESCRIPTION OF THE FIGURES

FIG. 2A is a diagrammatic view of a network of probes introduced into a hazard communicating with a hazard management system according to an example embodiment and mode.

FIG. 3A is a perspective view illustrating example shape and components of a probe according to a first example embodiment.

FIG. 15B being a top side perspective view of the bullet-shaped probe; FIG. 15C being a bottom side perspective view of the bullet-shaped probe; FIG. 5D being a side view of the bullet-shaped probe in a semi-shut configuration; and FIG.

15E being a top perspective view of open casing base section and open casing nose section of the bullet-shaped probe.

Figure 16:
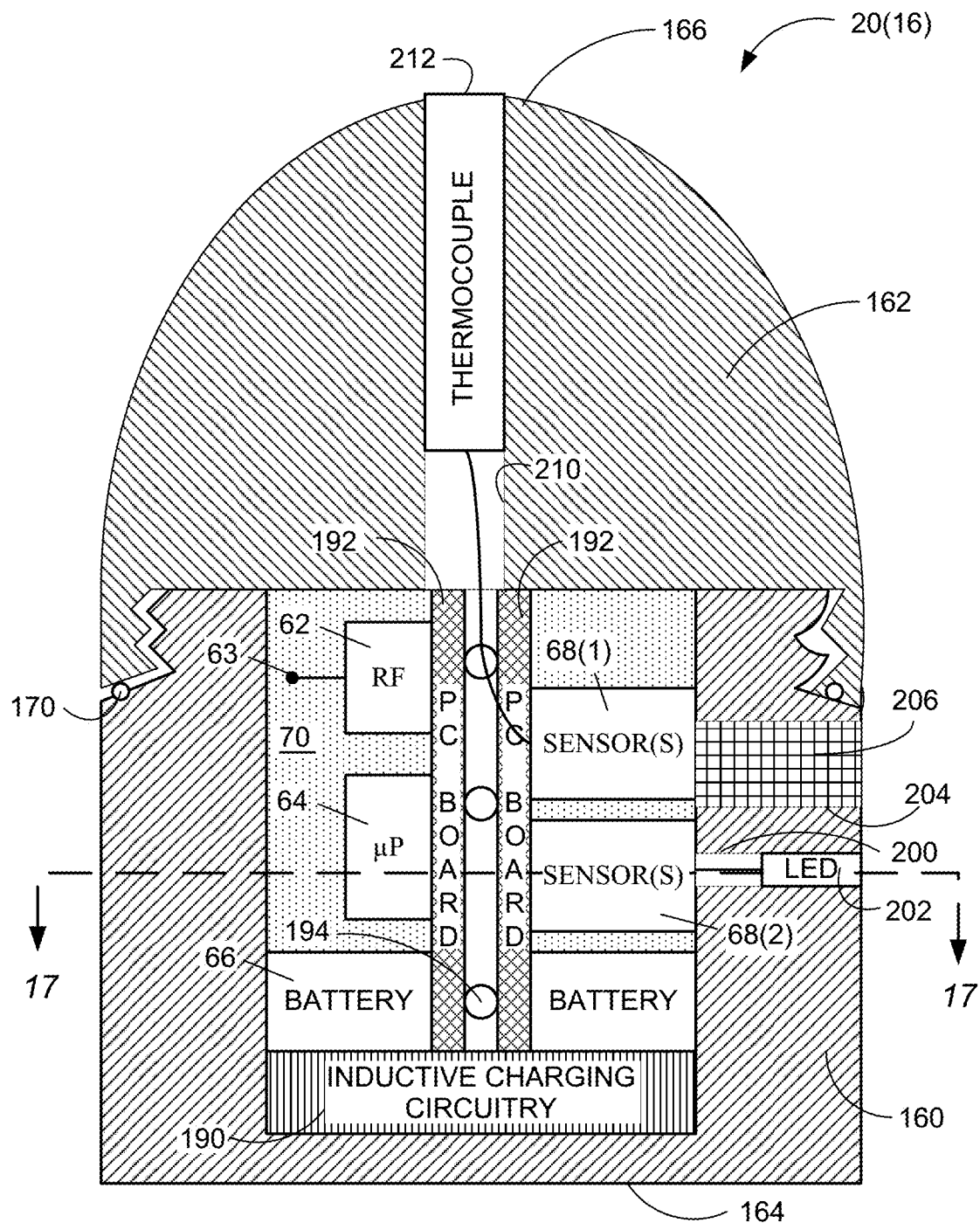

FIG. 16 is a sectioned side view of an example implementation of an assembled bullet-shaped probe.

Figure 17:
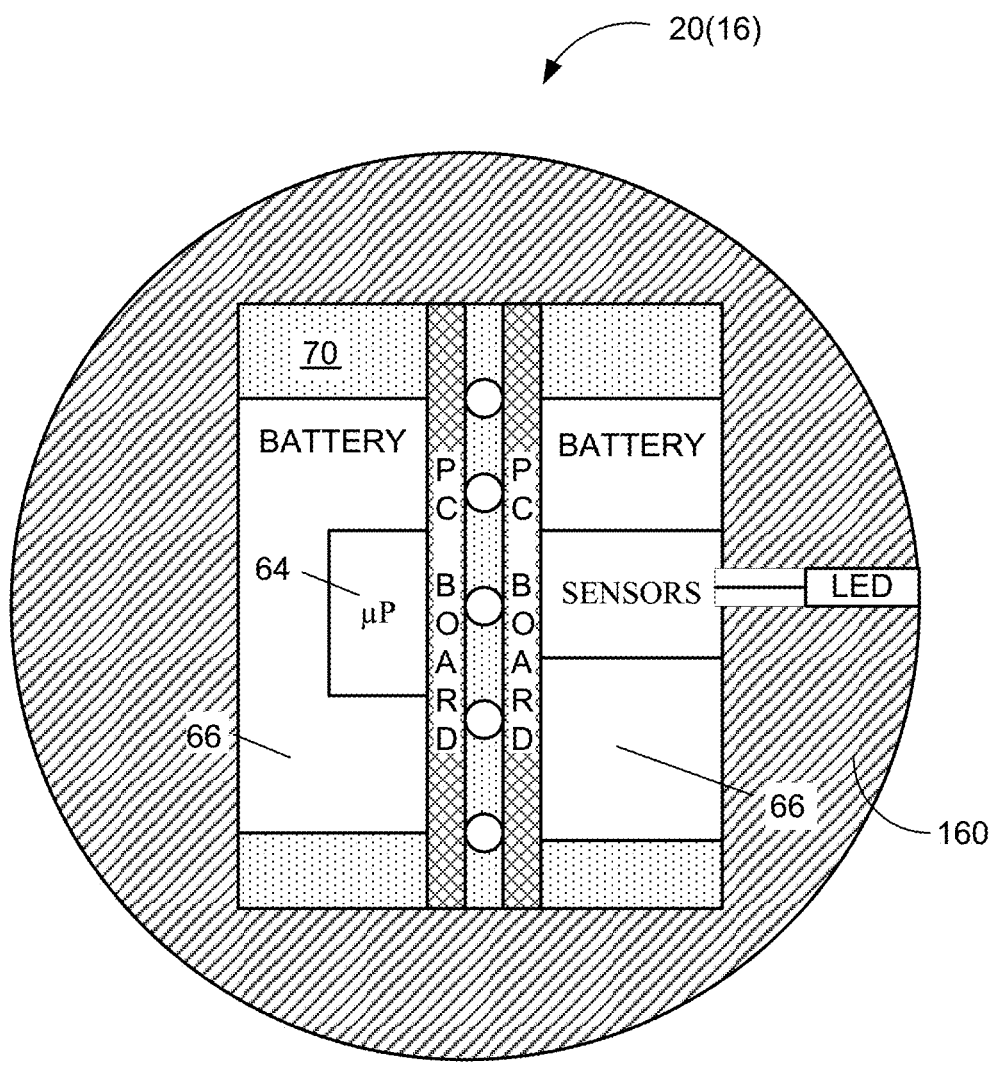

FIG. 17 is a top sectioned view taken along line 17-17 of FIG. 16.

Figure 18:
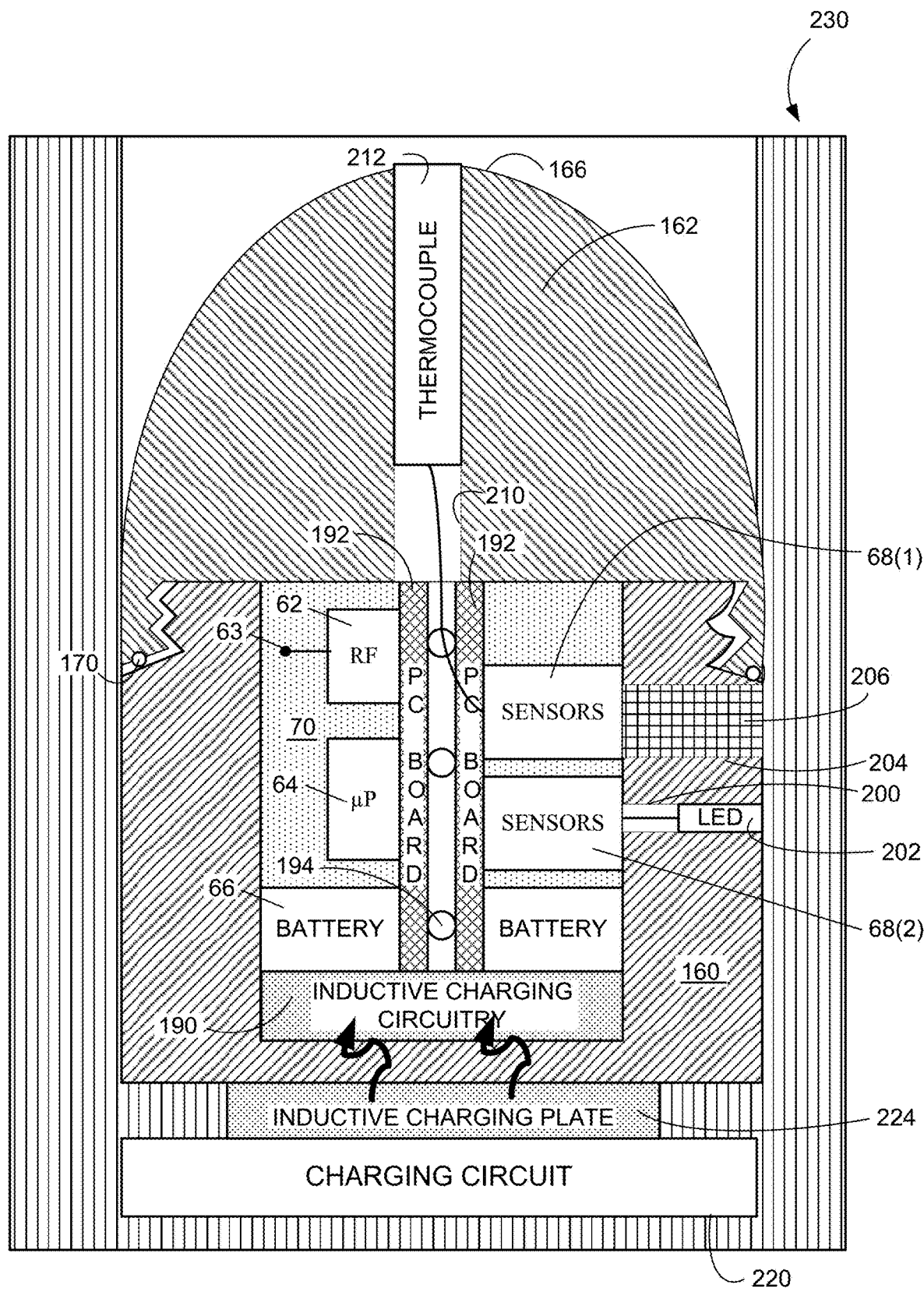

FIG. 18 is a cross sectional view of a probe in a probe case, the probe case having a charging circuit.

Figure 19:
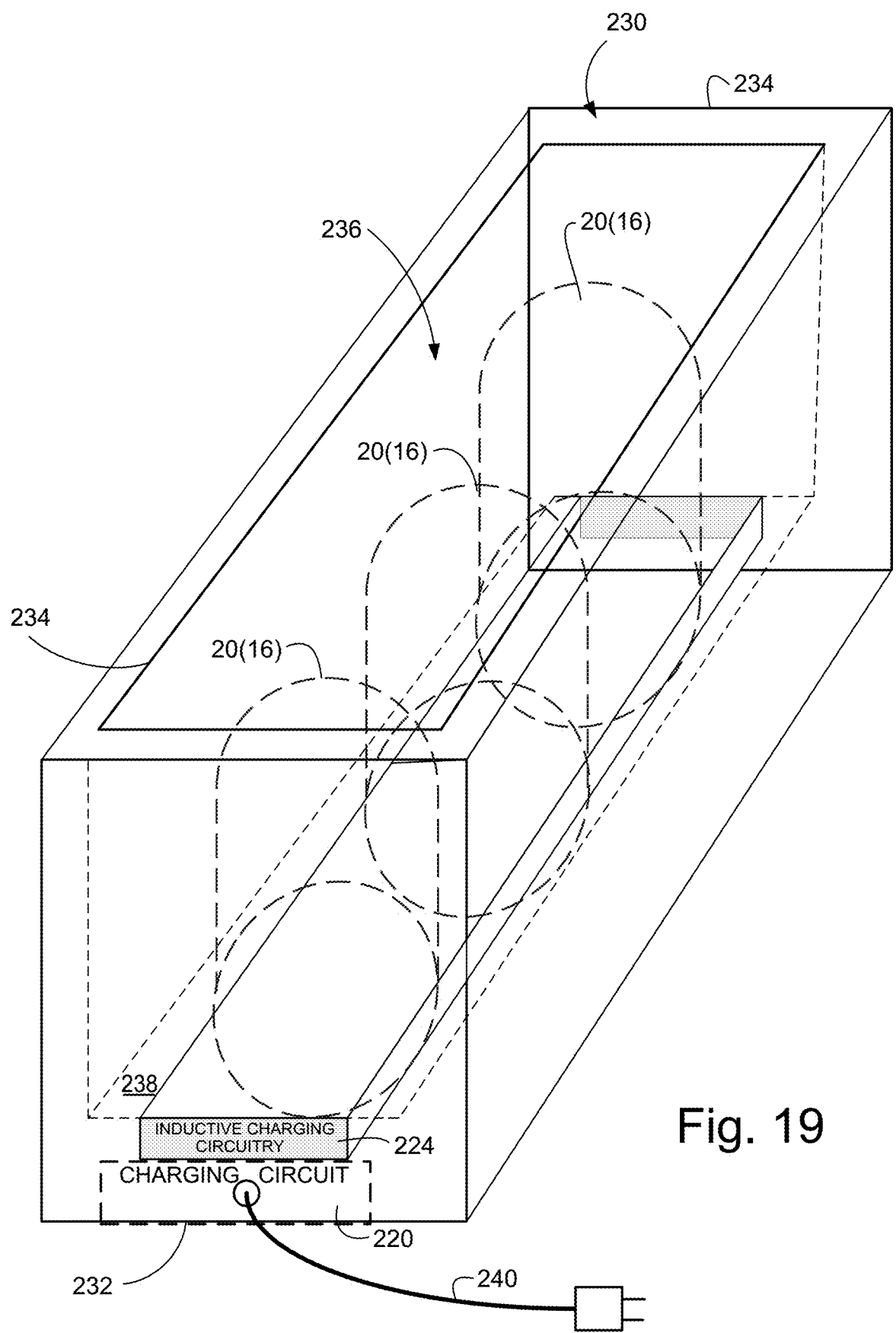

FIG. 19 is more of a perspective view of a probe case and gives an idea of how the probes may be positioned in the case relative to a case charging plate.

DETAILED DESCRIPTION

The following description sets forth specific details, such as particular embodiments for purposes of explanation and not limitation. But it will be appreciated by one skilled in the art that other embodiments may be employed apart from these specific details. In some instances, detailed descriptions of well-known methods, interfaces, circuits, and devices are omitted so as not to obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer-readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus, machine-implemented.

In terms of hardware implementation, the functional blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
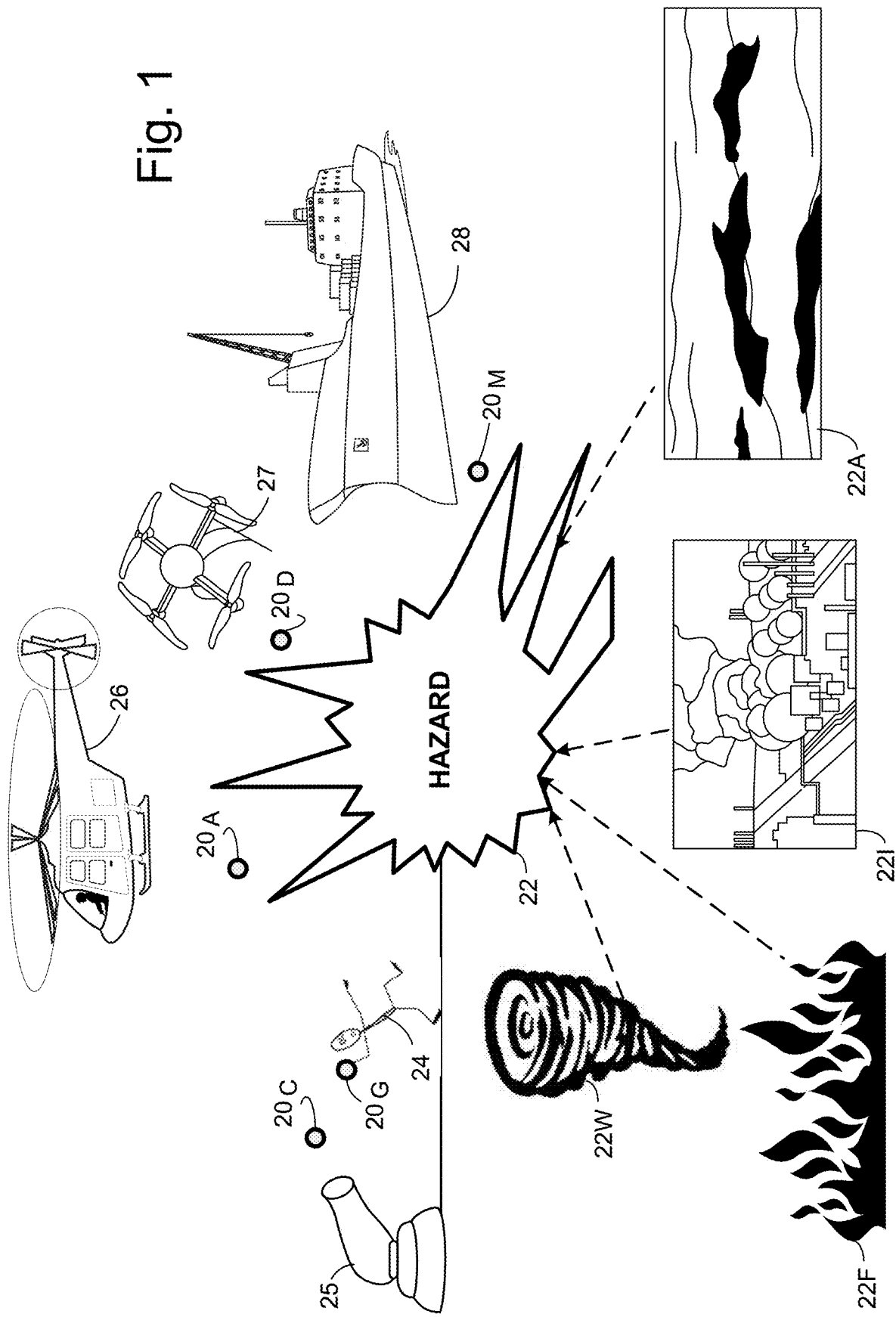
FIG. 1 is a diagrammatic view of a hazard management operation into which one or more probes may be introduced according to an example embodiment and mode.

FIG. 1 illustrates a hazard management operation into which one or more intelligent pods or probes 20 are introduced into vicinity of a hazard 22. Although FIG. 1 depicts the hazard 22 generically, the hazard 22 may be any human-caused or naturally occurring event that threatens man or nature. FIG. 1 shows some non-limiting representative possible hazards. For example, the hazard 22 may be a fire hazard 22F, such as a forest fire, brush/grassland fire, building fire (single dwelling fire, industrial fire, urban fire). Alternatively the hazard 22 may be a weather condition or storm hazard 22W, depicted by a tornado in FIG. 1 but also encompassing other types of severe weather or geological situations (such as hurricanes, blizzards, earthquakes). Another type of hazard is an industrial hazard 22I, which may involve a cargo spill, emissions discharge, or fall out, whether chemical or nuclear. While some hazards may occur on land, as used herein "hazard" is not so limited, as there may be aquatic or marine hazards 22A such as an oil spill or other invasion of marine life. As used herein, the term "hazard" encompasses all the foregoing and any other threatening events or situations, such as disaster and military action, for example.

In accordance with one aspect of the technology disclosed, the intelligent pods or probes 20 described herein are introduced into a vicinity of the hazard 22. The probes 20 may be introduced into a hazard 22 in various ways, or combination of ways. Probe introduction into a hazard 22 may be from land, air, or sea, for example. In terms of an example land introduction, FIG. 1 shows a human 24 projecting probe $20_L$ into hazard 22. Projecting of a probe 20 on land can simply be by throwing (as shown in FIG. 1), or by using an instrumentality such as a cannon 25 (such as an air cannon) to launch the probe $20_C$ into hazard 22. For a building fire, for example, the probe 20 can be thrown into window on lower floors, or fired from cannon 25 or other launching mechanism onto higher floors. Aerial introduction of probe 20 is generally depicted by aircraft 26 dropping or even shooting probe $20_A$ into hazard 22, or by a drone 27 delivering probe $20_D$. The aircraft 26 could be any type of aircraft, e.g., airplane, helicopter, etc. Sea or nautical introduction of probe 20 is represented by a ship or vessel introducing probe $20_M$ into a body of water, by dropping, discharging, or propulsion, either from above water surface or below water surface. As used herein, terms such as "projecting", "launching", and "dropping" of a probe means a deliberate displacing the probe from away from a host, e.g., a human or launching instrumentality (e.g., canon, aircraft, drone, or water craft), into a hazard, as opposed to the probe being permanently situated or just wandering in or finding itself in a hazard location without detachment from a host.

FIG. 1 pictorially illustrates a generic hazard management operation. As used herein, "hazard management" may encompass one or both of hazard assessment and hazard mitigation. FIG. 2A schematically depicts example activities and assets that may typically be involved in a hazard management system 40 according to an example embodiment and mode of the technology disclosed herein. FIG. 2A depicts by circle 30 a vicinity of hazard 22, e.g., the hazard vicinity 30, in which plural probes 20 have already been introduced. The particular hazard 22 of FIG. 2A may be a fire, for example, on a day when wind is blowing in direction depicted by arrow 32. The hazard vicinity 30 is conceptualized as comprising four quadrants, with probes 20 being numbered as probes $20_1$ through $20_8$ beginning in a first quadrant and numbering in counter-clockwise order. Some of the probes 20 have been introduced into hazard vicinity 30 at anticipated locations of travel of the fire in view of the wind direction 32.

Figure 2B:
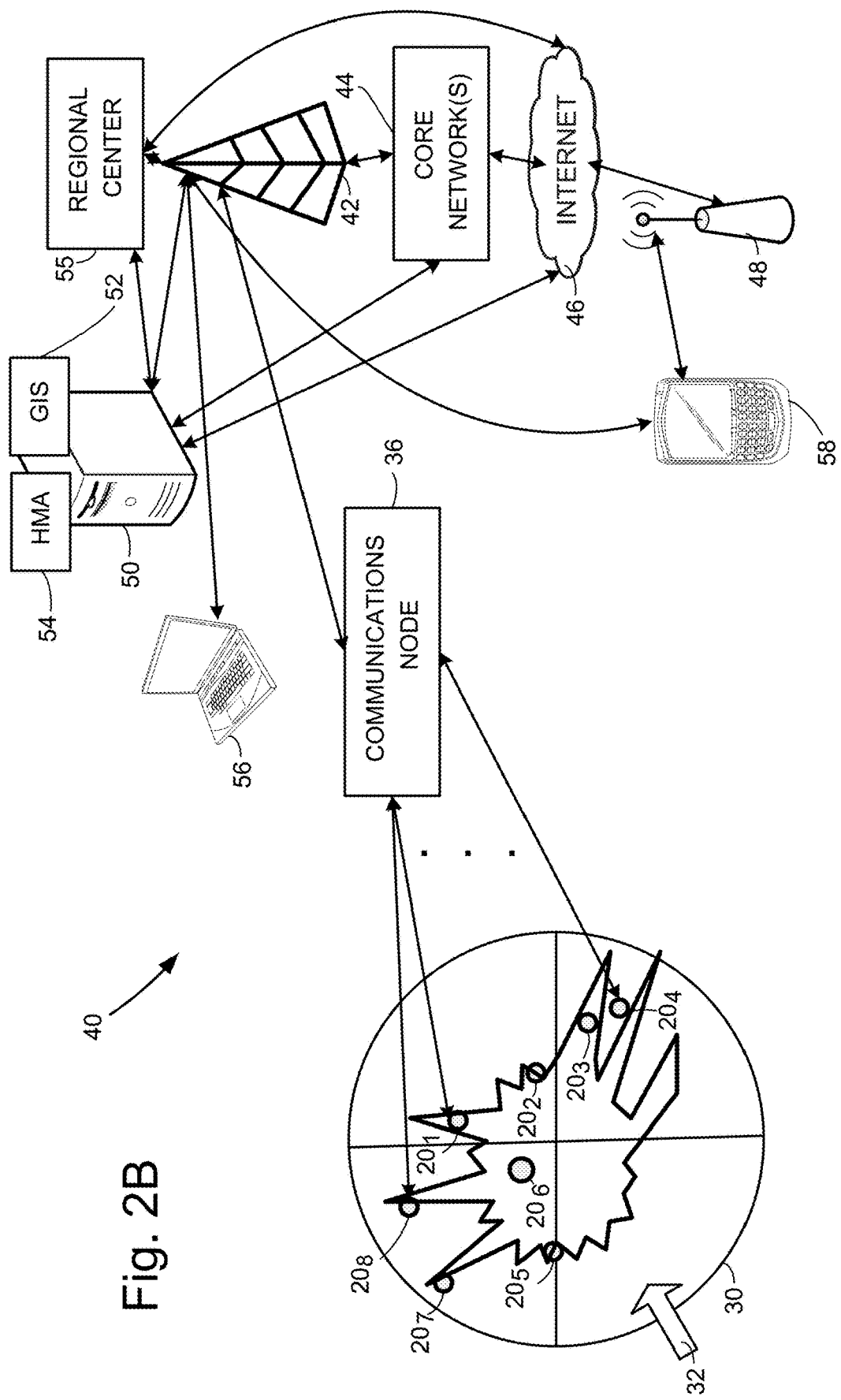
FIG. 2B is a diagrammatic view of a network of probes introduced into a hazard communicating with a hazard management system according to another example embodiment and mode.

FIG. 2A and FIG. 2B depict various ways in which the probes 20 may communicate in a hazard management system 40. In some example implementations the probes 20 may communicate with one another, as FIG. 2A illustrates by the broken lines 34 that at least some of the probes 20 may communicate wirelessly with one another in a mesh network 34 as well as with a radio communications module or node, herein known as hazard communications coordination node 36. The mesh network 34 may operate in accordance with IEEE 802.15 protocol or 900 MHz ISM radio access protocol, for example.

The hazard communications coordination node 36 serves to perform at least initial communications connection between the probes 20 and a hazard management site. In the simple implementation shown in FIG. 2A, the hazard management site is a computerized device, such as wireless mobile device illustrated as laptop 38. It should be appreciated that the hazard management site may comprise plural computerized devices such as plural laptops. These computerized devices, particularly if wireless and mobile, may be in the possession of emergency response personnel and thus transported to the proximity of the hazard if desired. Alternatively, one or more of the computerized devices may remain remote from the hazard, particularly if serving the role of an emergency coordination center. The computerized devices may be connected to hazard communications coordination node 36 using any suitable connection link or protocol, examples of which are understood with reference to FIG. 2B and/or FIG. 4, for example.

FIG. 2B shows another embodiment in which the probes 20 communicate through hazard communications coordination node 36 or directly with other radio communications equipment, such as base station 42. Although not shown as such in FIG. 2B for sake of simplicity, it should be understood that the probes 20 may communicate with each other, e.g., in a mesh network 34 or the like as shown in FIG. 2A. Although only one base station 42 is shown in FIG. 2B, the hazard communications coordination mode 36 and/or probes 20 may communicate with one or more base stations, depending on relative location of the probes 20 and the base stations. The base station 42 typically serves a cell or sector of a radio access network. The radio access network may be of any suitable technology type or generation. The base station 42 is in turn connected to one or more core networks 44 and through core networks 44 or otherwise to internet 46. Depending on the particular radio access network technology, the base station 42 may communicate directly with other base stations as well. FIG. 2B further illustrates that, in conventional fashion, one or more wireless access points 48 may be connected to internet 46. The wireless access points 48 may provide services such as WiFi services, for example.

As an alternative to communicating through a radio access network type base station 42, the probes 20 may communicate directly with wireless access points 48, or by Bluetooth, or with 900 MHz Industrial, Scientific, and Medical (ISM) radio access, or with an IEEE 802.15.4 mesh network, e.g., as part of mesh network 34. Therefore, the term "base station" encompasses not only a radio access network type base station but other types of base station services as well.

FIG. 2B further shows the base station 42 as being connected to hazard management server 50, which may comprise the hazard management site. As explained herein, the hazard management server 50 may host or provide access to both Geographic Information System (GIS) database 52 and hazard modeling application (HMA) 54. The connection of base station 42 hazard management server 50 may be direct, in which case the connection between base station 42 and hazard management server 50 may be either wireless or wired. Alternatively, the connection between base station 42 and hazard management server 50 may be through one or more of the core networks 44 or internet 46. The hazard management server 50 is not confined to one hardware unit or one location, but may comprise one or more servers which are either co-located or distributed. The hazard management server 50 typically comprises or encompasses one or more data bases, which may either be included in hazard management server 50 or remotely connected to hazard management server 50.

In addition to the probes 20 and hazard management server 50, in the example embodiment of FIG. 2B the hazard management system 40 includes one or more terminals provided to hazard responder personnel and/or hazard management personnel. The terminals may have wired connection, e.g., to internet 46, or alternatively may be wirelessly connected. Examples of hazard management terminals include one or more workstation(s)/terminal(s) situated at an emergency response regional center 55, laptop terminal 56, and mobile telephone 58 (e.g., smart phone), for example. Other types of wired and wireless terminals are may also be deployed to hazard management personnel who participate in hazard management system 40. Depending on location and extent of service, the emergency response regional center 55, the laptop terminal 56, and the mobile telephone 58 may be served by one or both of the radio access network (e.g., via base station 42) or by WiFi (e.g., via wireless access point 48). Although only three types of terminals (e.g., emergency response regional center 55, laptop terminal 56 and mobile telephone 58) are illustrated, it will be appreciated that often scores if not hundreds of persons may comprise a hazard management team, and accordingly that many terminals may be deployed in hazard vicinity 30.

Figure 3B:
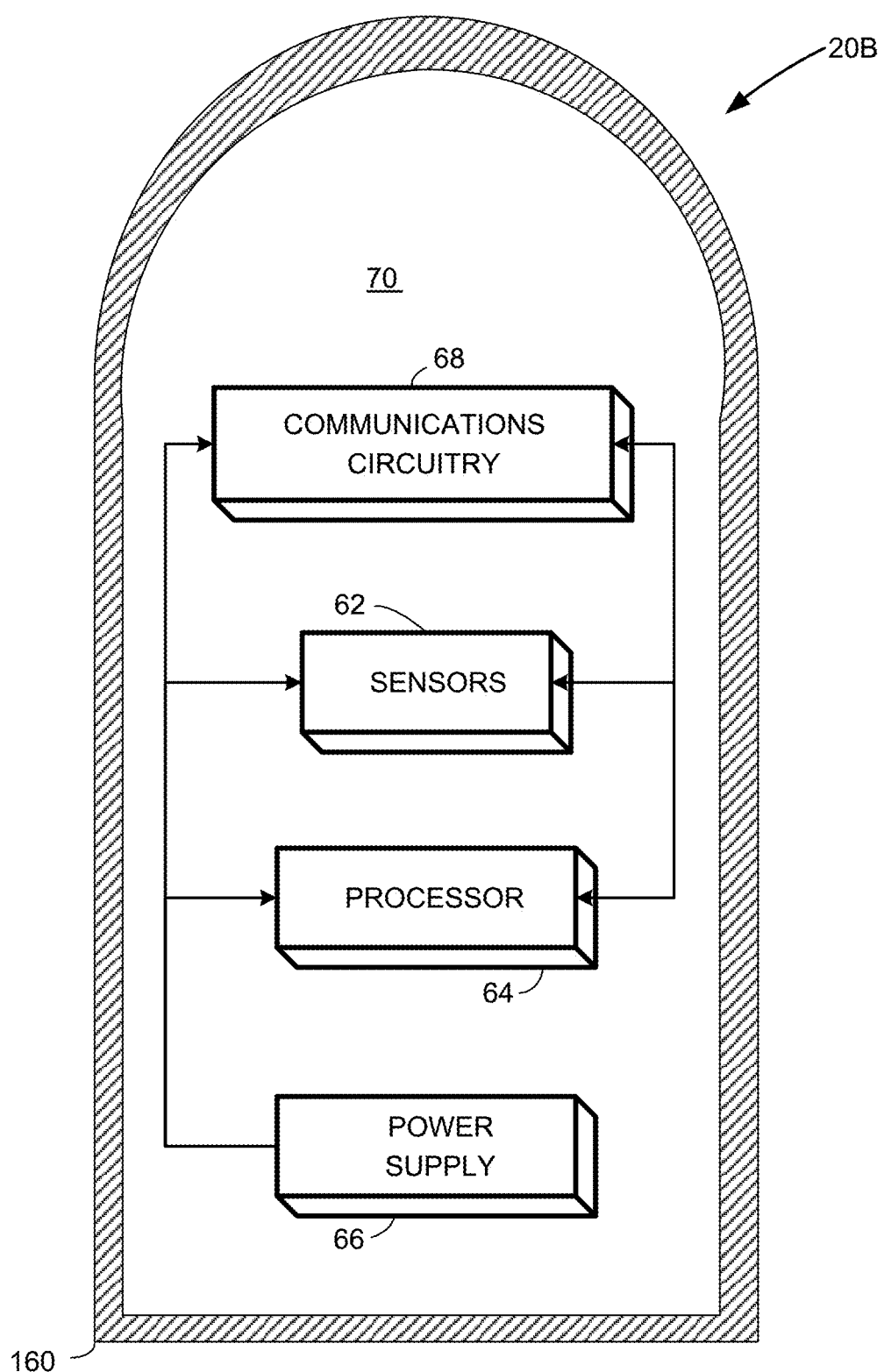
FIG. 3B is a cross-sectional diagrammatic view illustrating example shape and components of a probe according to a second example embodiment.

FIG. 3A provides a pictorial perspective of an example probe 20 and basic, representative components comprising the probe 20. The probe 20 comprises an outer housing or casing 60. In the illustrated example embodiment of FIG. 3A the probe casing 60A has essentially a spherical shape. In other example embodiments and modes the probe casing 60 may be configured in shapes other than a sphere, including multi-sided (e.g., dodecahedron) shapes and other shapes. For example, FIG. 3B and FIG. 15A-FIG. 15B, FIG. 16, and FIG. 17 show an example probe 20B comprising casing 60B having a bullet shape. Herein, reference to probe 20 is intended to generically refer to a probe of any casing shape, including but not limited to a probe having the spherical casing 60A of FIG. 3A and the probe 20B having the bullet shaped casing 60B of FIG. 3B.

In many implementations in which the probe 20 is introduced into the hazard 22 through a fluid such as air or liquid, it may be preferable that the probe casing 60 have suitable aerodynamic shape. Moreover, such aerodynamic shape may assist in situations in which, even after introduction into hazard 22, the probe 20 is transported through or around the hazard 22 by forces accompanying or caused by the hazard 22, e.g., wind or current, in order to obtain readings from differing locations In the example implementation of FIG. 3A, the spherical casing 60 has a diameter in a range from approximately 4 cm to 7 cm (plus or minus 0.5 cm) and a weight in a range from about 30 grams to about 150 grams. In at least some example embodiment and modes the probe casing 60 is fabricated by three dimensional printing.

In at least some example embodiment and modes the probe casing 60, regardless of shape, comprises a hazard-hardened material configured to withstand conditions and forces of the hazard for at least a predetermined time. The material of the probe casing 60 thus may depend on the specific type of hazard into which the probe 20 is configured for introduction or injection. Non-limiting example materials for probe casing 60 may include polylactic acid (PLA), photopolymer and polyjet materials.

As shown both in FIG. 3A and FIG. 3B, housed within probe casing 60 are probe internal components including probe communications circuitry 62, probe processor circuitry 64, probe power supply 66; and probe sensors 68. One aspect of the technology disclosed herein is that all these components are essentially co-located (e.g., in the sense that the components are internal to probe casing 60) and are not distributed or disparately located on different parts of a carrier agent (e.g., a human or instrumentality). As such, the interconnections of the components are within probe casing 60 and thus experience a same protection from/relation to the hazard 22.

Each of probe communications circuitry 62, probe processor circuitry 64, probe power supply 66, and probe sensors 68 may reside on one or more chips on one or more boards within the interior of probe casing 60. Such chips or boards may be at same or different diameter levels (e.g., at different planes within the interior of probe casing 60). Space within probe casing 60 not occupied by one of these components may be filled with suitable probe filler material 70, such as an appropriate insulation or other protective material that does not interfere with the operation of probe communications circuitry 62.

It should be appreciated that the configuration of probe communications circuitry 62 depends on which one or more types of radio frequency access technologies the probe 20 utilizes. For example, the probe communications circuitry 62 may be configured for cellular communication, for WiFi communication, for Bluetooth communication, or license-free Industrial, Scientific, Medical (ISM) frequency bands, or for a combination of one or more of these or other technologies. Each technology type may indeed have its own sub-module or sub-circuitry within probe communications circuitry 62.

The probe sensors 68 may be plug-in type sensors that may be selectively included in probe 20 upon fabrication by connecting the desired type of sensor into a suitable plug or port location on a board internally provided in probe casing 60. Non-limiting, representative examples of different types of probe sensors 68 are described below.

Figure 4:
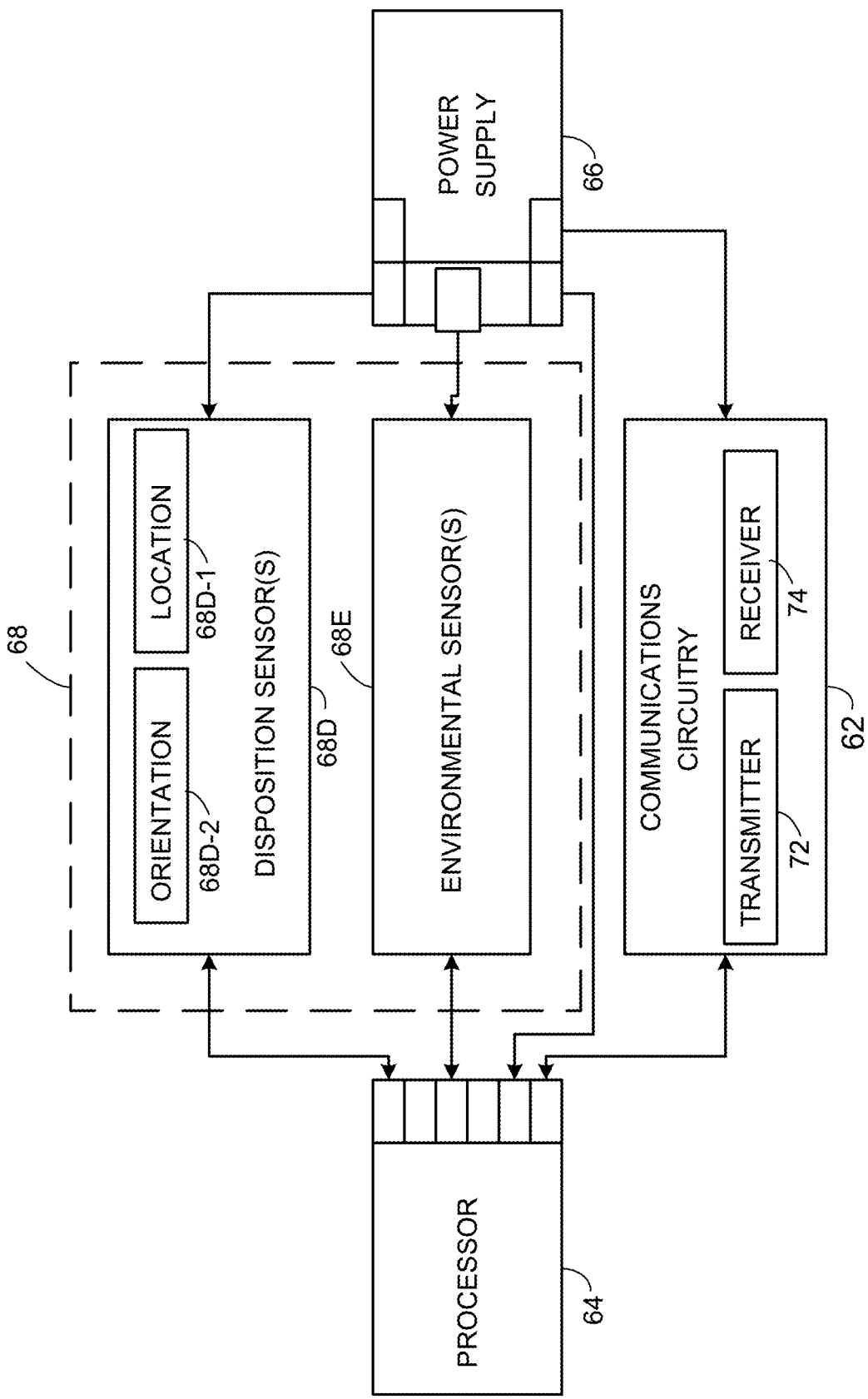
FIG. 4 is a schematic view showing in more detail example components of the probe of FIG. 3A or the probe of FIG. 3B.

FIG. 4 shows schematically in more detail example components of an example implementation of a probe 20, and particularly shows that in general probe sensors 68 comprise two general types: probe disposition sensor(s) 68D and environment sensors 68E. In an example embodiment and mode, probe 20 comprises at least two types of sensors, and preferably at least one probe disposition sensor(s) 68D and at least one environment sensors 68E.

As illustrated in FIG. 4, the probe disposition sensor(s) 68D may comprise probe location sensor 68D-1 and probe orientation sensor 68D-2. One example of probe location sensor 68D-1 is a Global Positioning System (GPS) device. The probe location sensor 68D-1 may provide information such as time, latitude, longitude, heading, and speed. The probe orientation sensor 68D-2 may provide information such as yaw, pitch, roll, quaternion, and acceleration. The probe orientation sensor 68D-2 may comprise one or more of accelerometers, gyroscopes, and magnetometers.

FIG. 4 also shows that the probe processor circuitry 64 comprises plural ports through which connections are respectively made with each of the probe communications circuitry 62, probe power supply 66, and probe sensors 68. Likewise the probe power supply 66, which essentially serves as a battery, has plural power take-off terminals for supplying electrical power to each of probe communications circuitry 62, probe processor circuitry 64, and the probe sensors 68. Yet further, FIG. 4 illustrates that the probe communications circuitry 62 comprises a wireless transmitter 72 and, at least in some example embodiments, a wireless receiver 74. In the case where wireless receiver 74 is employed, the probe may be used as a radio relay between a network of probes (e.g., mesh network 34) and a long-range radio relay from the probe network to a ground-based receiver that is part of the ground-based processing system.

Figure 5:
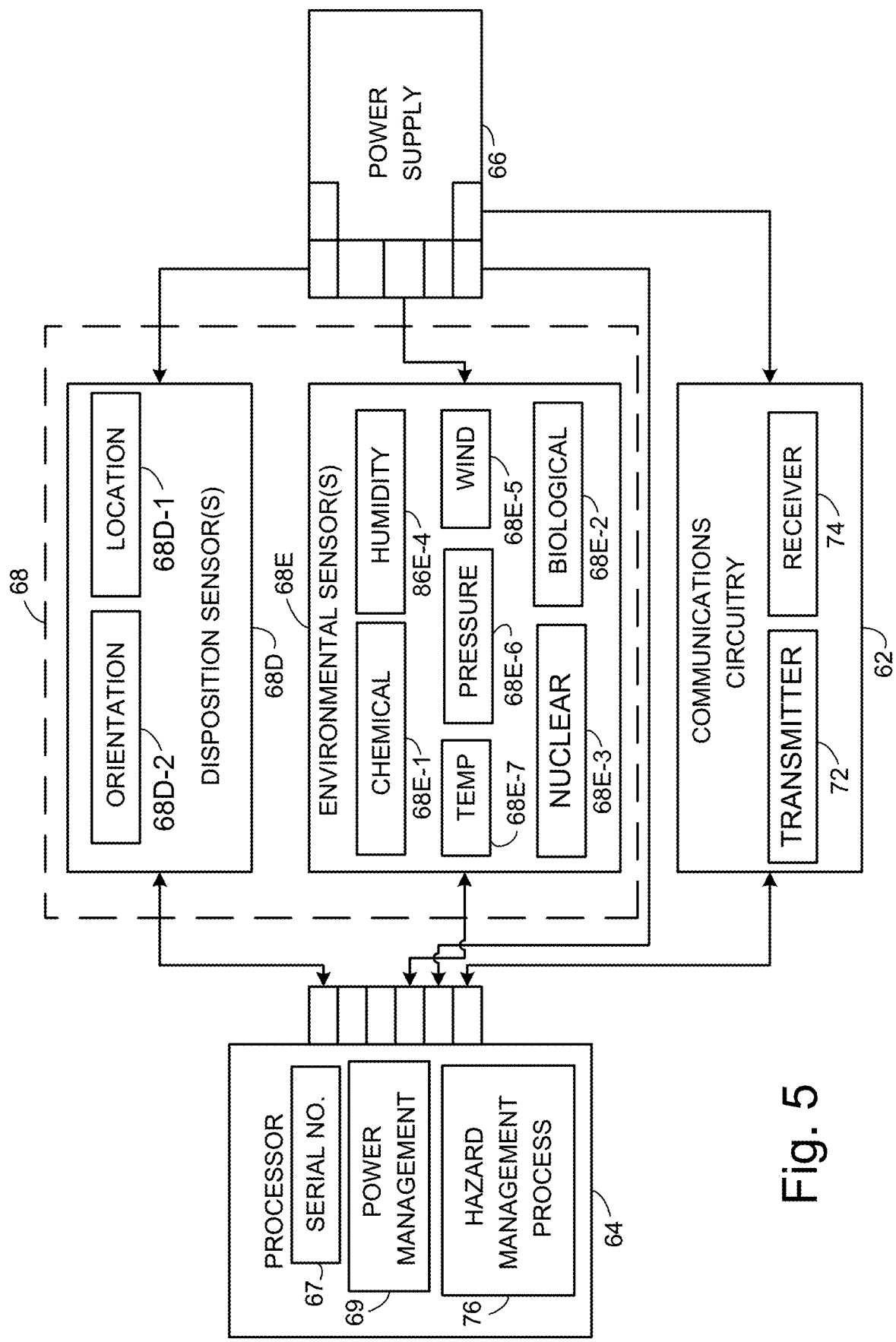
FIG. 5 is a schematic view showing in yet more detail example components of a probe, and particularly shows representative, non-limiting examples of environment sensors.

FIG. 5 shows schematically in yet more detail example components of an example implementation of a probe 20, and particularly shows representative, non-limiting examples of environment sensors 68E. One, two, or more of the environment sensors 68E herein described may be included, it being understood that not all environment sensors 68E need necessarily be included in a probe 20. Some probes may be custom configured with certain types of environment sensors 68E for mitigating certain types of hazards.

The example environment sensors 68E illustrated in FIG. 5 include one or more chemical sensors 68E-1. The chemical sensors 68E-1 may be a package for detecting presence and extent of one chemical elements or compounds, or a combination of chemical elements and/or compounds. There may be plural chemical sensors 68E-1, with each configured to sense for a specific chemical element, compound, or condition. The chemical sensors 68E-1 may share a board or connection to probe processor circuitry 64, or may have their own boards and connections.

Other environmental sensors 68E include biological sensors 68E-2 and nuclear sensors 68E-3. The biological sensors 68E-2 may be configured to detect certain biological agents, viruses, or life forms. The nuclear sensors 68E-3 may detect certain nuclear particles and/or radiation. As in the case of the chemical sensors 68E-1, the biological sensors 68E-2 and nuclear sensors 68E-3 may either be consolidated with other sensors or the same or different types, or have dedicated boards and connections to probe processor circuitry 64 and probe power supply 66.

In addition to biological, chemical, and nuclear sensors, the environmental sensors 68E section of probe 20 may include humidity sensor 68E-4, wind sensor 68E-5 (for measuring wind direction, wind velocity, or both), atmospheric pressure sensor 68E-6, and temperature sensor 68E-7. Other types of environmental sensors 68E may also be included in probe 20, the foregoing being only representative of one or more types that may comprise probe 20.

FIG. 5 also shows that probe processor circuitry 64 has access to other information, either internally provided at probe processor circuitry 64 or otherwise (e.g., in a separate register or chip or board). For example, probe processor circuitry 64 has access to an identification number or serial number 67 for probe 20. Each probe 20 may have a different (unique) serial number for identification purposes (allocated by manufacturer), and different types of probes 20, e.g., probes 20 configured to mitigate different types of hazards, may have different identifier conventions (e.g., different prefixes or suffixes or other ways of expressing classification within a serial number scheme). The serial number 67 may be configured in the probe processor circuitry 64 or elsewhere in probe 20, or may be downloaded in the event the probe 20 is provided with a wireless receiver 74 which can receive the serial number 67 as externally transmitted from another source. An outer surface of the probe casing 60 may also bear readable indicia (e.g., barcode) or serial number which can be scanned or otherwise noted, e.g., before deployment. In addition, in conjunction with utilization of probe power supply 66 the probe processor circuitry 64 has access to and/or executes power management function 69.

Figure 15A:
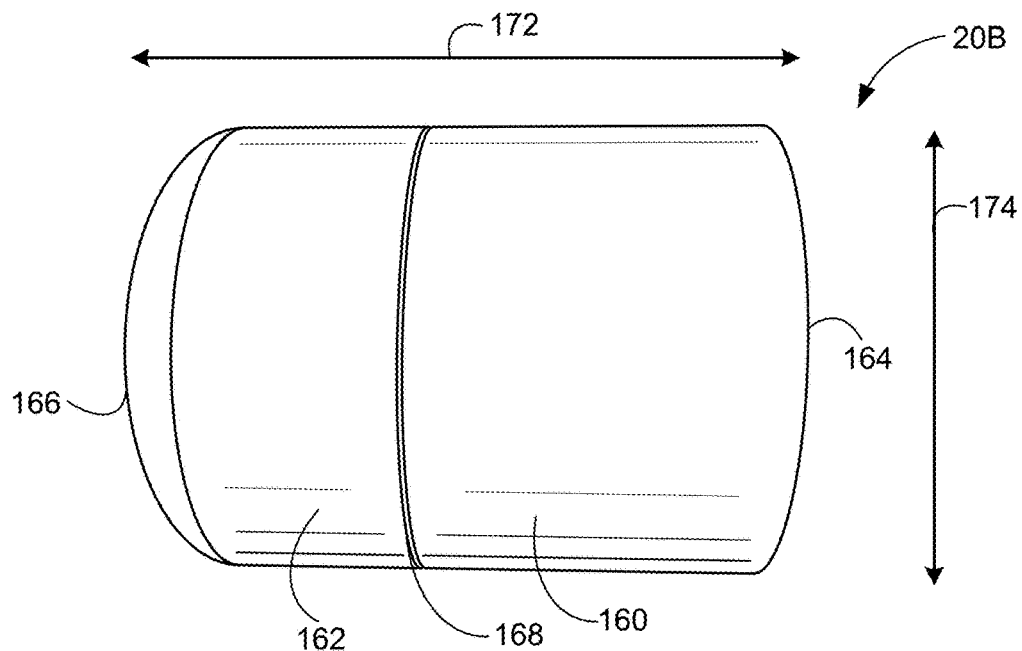
FIG. 15A-FIG. 15E are views of an example bullet-shaped implementation of the probe of FIG. 3B, with FIG. 15A being a side view of the bullet-shaped probe.
Figure 15B:
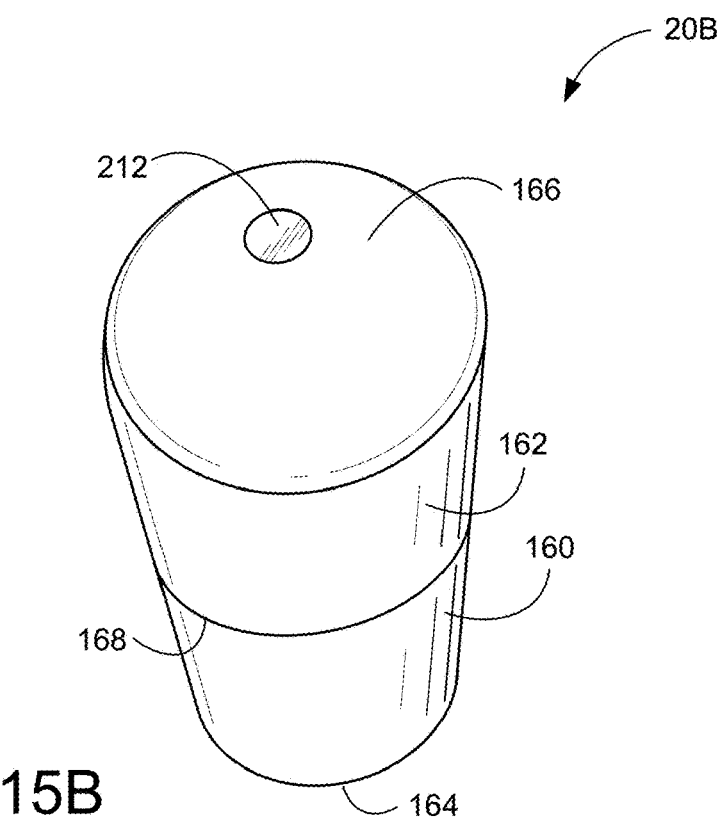
Figure 15C:
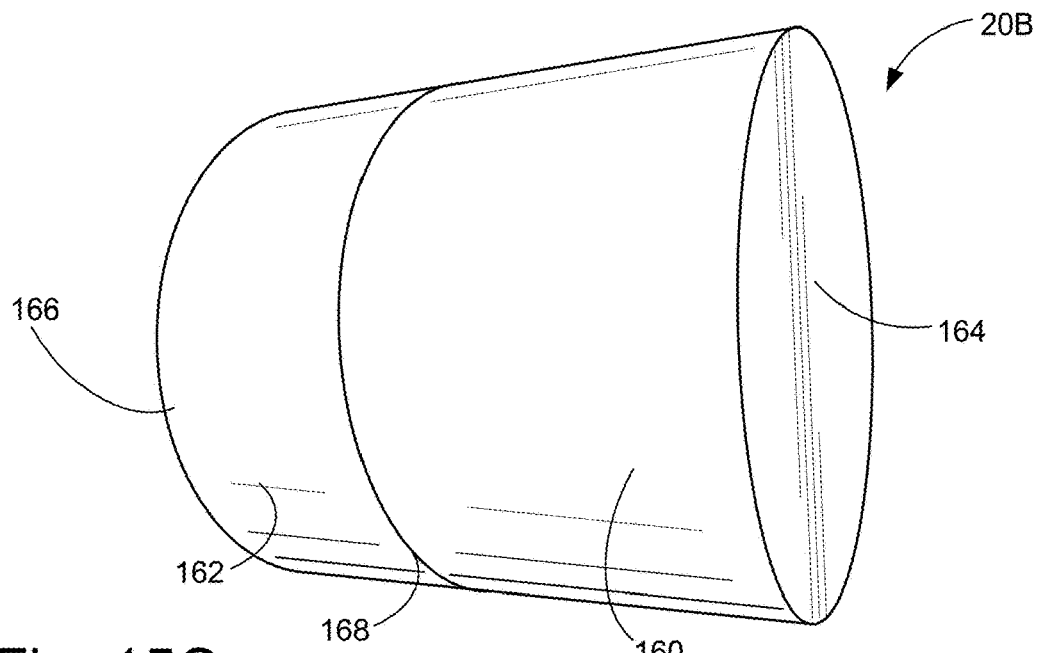
Figure 15D:
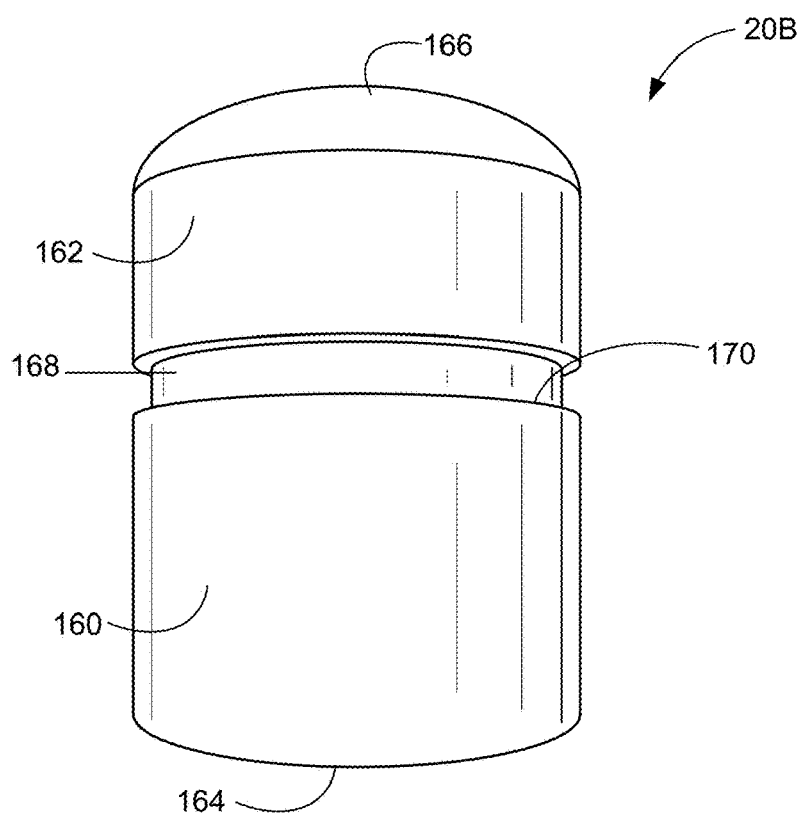
Figure 15E:
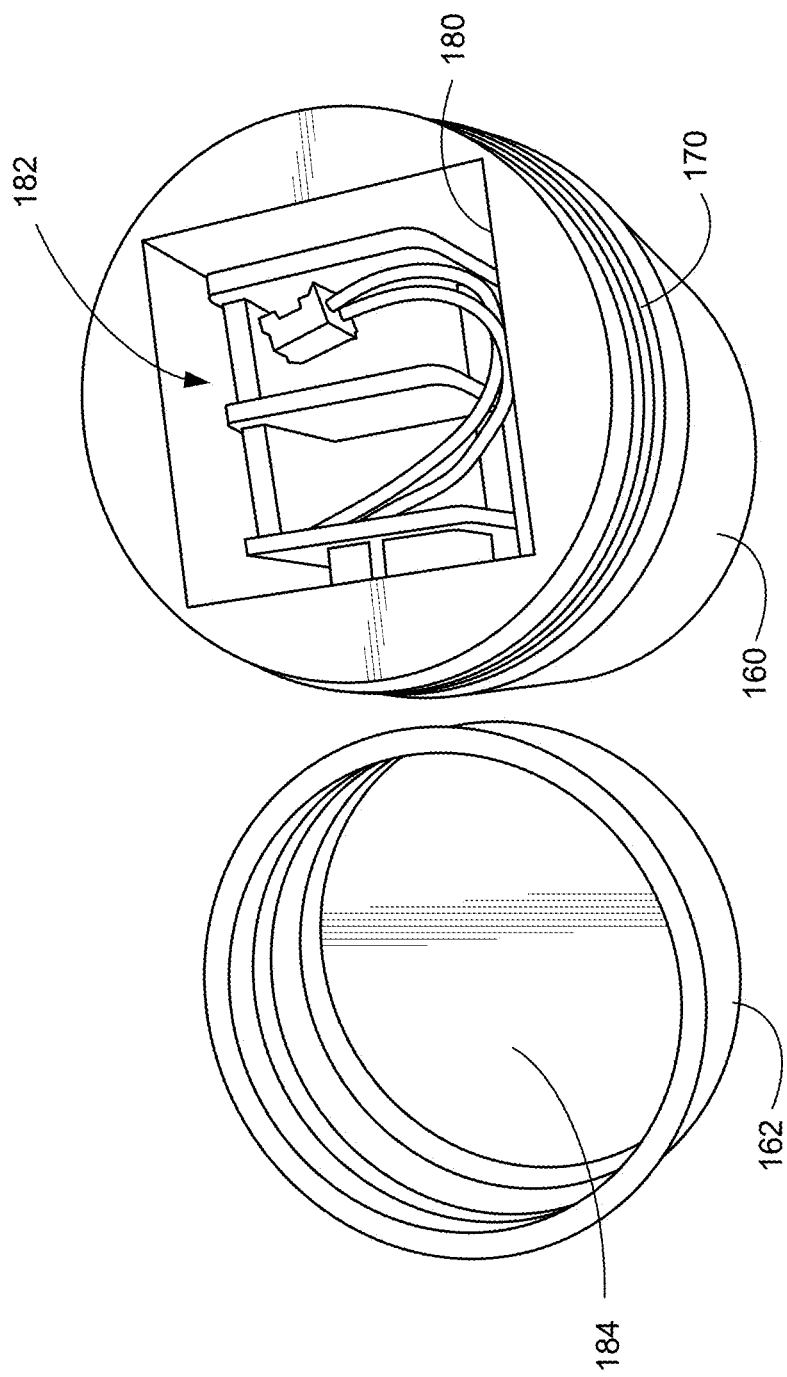

FIG. 15A-FIG. 15E show an example implementation of the bullet-shaped probe 20B of FIG. 3B in which probe casing 60B has a bullet shape. As understood, e.g., from FIG. 4, casing 60B is configured to internally house the multiple sensors 68, the communications circuitry, and the processor circuitry. The casing 60B comprising an essentially cylindrical bullet shape. For example, along a major cylindrical axis a first end of the casing comprises a flat butt surface or butt end 164 and a second end of the casing comprises a rounded nose surface or nose end 166. In a particular example implementation shown in FIG. 15A-FIG. 15E, probe casing 60B comprises two mating casing sections: casing base section 160 and casing nose section 162. The casing base section 160 has cylindrical shape with a closed, flat butt end 164 at one end and a mouth at an end which is opposite the flat butt end 164. The casing nose section 162 is also cylindrical, but has a rounded nose surface 166 and a mouth end opposite the rounded nose surface 166. The casing base section 160 and the casing nose section 162 are joined together/mated at casing seam 168. For example, the casing base section 160 and casing nose section 162 may be press fit together at casing seam 168, or may be threaded for engagement at casing seam 168. As shown in FIG. 15D, a sealing ring or washer 170 may be provided at the casing seam 168. FIG. 15D shows the casing base section 160 and the casing nose section 162 in a semi-mated state, e.g., with the casing nose section 162 not entirely snug on casing base section 160. FIG. 15E shows the casing base section 160 and casing nose section 162 apart from one another, and further shows an interior of both casing base section 160 and casing nose section 162.

The interior of casing base section 160 has a three dimensional quadrilateral base section cavity 180 which is open at the aforementioned mouth. In an axial plane of casing nose section 162 the base section cavity 180 has a square shape. A depth of the base section cavity 180 is sufficient to house the electronics 182 (e.g., processors, sensors, telecommunications circuitry) of the probe 60B. For the particular probe shown in FIG. 15A-FIG. 15E the interior of the casing nose section 162 comprises a hollow cylindrical cavity 184.

FIG. 16 and FIG. 17 show an example implementation of an assembled bullet-shaped probe 20(16). FIG. 16 shows a sectioned side view of the bullet-shaped probe 20(16); FIG. 17 is a top sectioned view taken along line 17-17 of FIG. 16. As with the probe of FIG. 15A-FIG. 15E, the bullet-shaped probe 20(16) comprises casing base section 160 and casing nose section 162. Other elements of the bullet-shaped probe 20(16) that are similar to those of FIG. 15A-FIG. 15E are similarly numbered. Likewise, FIG. 16 and FIG. 17 show elements of probe electronics 182, positioned within quadrilateral base section cavity 180, as comprising elements also depicted in the generic probe of FIG. 4, including such elements as probe communications circuitry 62 (which is connected to and associated with one or more probe antenna 63 mounted and extending within quadrilateral base section cavity 180), probe processor circuitry 64, probe power supply 66, and probe sensors 68 (illustrated as sensors 68-1 and 68-2 in FIG. 16 and FIG. 17).

The probe electronics 182 of the bullet-shaped probe 20(16) further comprises probe internal inductive charging circuitry 190. When operating in combination with an external inductive charging circuit, probe inductive charging circuitry 190 serves to perform inductive charging for/to the probe power supply 66, shown as chargeable battery(ies) 66 in FIG. 16 and FIG. 17. Preferably the probe inductive charging circuitry 190 includes a quadrilateral charging plate which is situated at a bottom of quadrilateral base section cavity 180 near the butt end 164 of bullet-shaped probe 20(16). The probe inductive charging circuitry 190 is connected to and preferably situated near the chargeable battery(ies) 66. As mentioned, probe inductive charging circuitry 190 operates in conjunction with a complementary charging circuit as herein described with reference to FIG. 18 and FIG. 19, for example, somewhat in like manner as a secondary transformer coil operating in conjunction with a primary transformer coil. Thus, the material and thickness of the casing of bullet-shaped probe 20(16) is chosen to permit the inductive charging operation. As used herein, "charging" encompasses both charging and recharging.

FIG. 16 and FIG. 17 illustrate the probe electronics 182 as being situated on one or more circuit boards, e.g., printed circuit boards, illustrated as circuit boards 192. In the example configuration of FIG. 16 and FIG. 17 a major plane of the circuit boards 192 are oriented in a direction of the depth of quadrilateral base section cavity 180, e.g., parallel to dimension 172 of FIG. 15A. For sake of example, two circuit boards 192 are illustrated, it being understood that a lesser or greater number may instead be provided, and the orientation may be other than parallel to the major axis of the cylinder of the casing. In the illustrated example, the two circuit boards 192 are parallel to one another and are separated by one or more board spacers 194, although such separation may not be utilized in some example implementations. As shown in FIG. 16 and FIG. 17, one of the circuit boards 192 has mounted thereon or is connected to the probe communications circuitry 62 and probe processing circuitry 64, and another of the circuit boards 192 has mounted thereon or is connected to probe sensors 68(1) and 68(2). The elements arranged or connected to the respective circuit boards 192 may be otherwise configured, and may either reside wholly on one of the circuit boards 192 or be distributed among plural circuit boards 192. Elements of the plural circuit boards 192 may be and preferably are electrically connected to one another. FIG. 16 and FIG. 17 show that a battery 66 may be borne by or connected to each of the circuit boards 192, but it should be understood that only one of the circuit boards 192 may carry a battery 66, and indeed that the power supply may be physically distinct from any of the circuit boards 192.

In the example configuration of FIG. 16 and FIG. 17 the casing of bullet-shaped probe 20(16) may have one or more ports or openings formed therein. For example, an I/O port 200 may be provided radially through casing base 160 and communicating with the quadrilateral base section cavity

180 so that an input/output unit, such as light emitting device (LED) 202 connected to one of the sensors 68, may be positioned in the port 200 and thereby be externally visible with respect to the probe casing. The light emitting device (LED) 202 may be illuminated as appropriate for indicating, e.g., activation or proper functioning of the associated sensor(s) 68. Other types of input/output devices may be situated in or accessed through I/O port 200, such as an activation switch or reset switch, for example.

Another example of a port or opening provided in casing base 160, or alternatively in casing nose 162, may be a sensor window port 204. The sensor window port 204 may accommodate a membrane or membrane unit 206 that permits (e.g., selectively permits) access by one or more sensed environmental elements (e.g., gas or radiation) to one or more sensor(s) 68. Preferably the membrane unit 206 is waterproof and/or the interior of quadrilateral base section cavity 180 sealed so that neither moisture nor corrosive element has access to or damages any probe electronics 182 within quadrilateral base section cavity 180. An example membrane material is Gor-Tex®.

Yet another example of a port of opening provided in the casing of bullet-shaped probe 20(16) is nose port 210, provided in casing nose section 162. The nose port 210 may be utilized to accommodate an appropriate sensor or other device, such as thermocouple 212 as shown in FIG. 16 and FIG. 17. The sensor or device situated within nose port 210 may be connected to probe electronics 182 (e.g., to a sensor or processor).

In addition to ports, the casing may also be etched, e.g., for example, with appropriate logo or other information. The depth of such etching may vary, and such may depend on or facilitate particular use of the probe. If the function of the probe is primarily for temperature monitoring, the etching may be to a depth roughly half the thickness of the casing wall so as to retain its full waterproof characteristics. On the other hand, if the function of the probe is for more hazardous sensing, the casing may be etched completely through the wall and then lined internally with a gas permeable membrane, as mentioned above, to provide for HAZMAT detection, but also retain some level of water resistance.

As mentioned above, the probe inductive charging circuitry 190 may operate in conjunction with a companion charging circuit so as to keep battery(ies) of the bullet-shaped probe 20(16) charged and ready for service. Such may be particularly important when the bullet-shaped probe 20(16) is stored for potential use or in transit to a hazard location. FIG. 18 and FIG. 19 show an example implementation of a companion charging circuit, particularly host charging circuit 220. The host charging circuit 220 typically comprises or operates in conjunction with a host inductive charging plate 224. The host inductive charging plate 224 is typically located to be proximate and preferably parallel to a similar charging plate comprising the probe inductive charging circuitry 190. The host charging circuit 220 operates somewhat as a primary coil of a transformer to induce charge in a secondary coil of the probe inductive charging circuitry 190.

In an example configuration shown in FIG. 18 and FIG. 19 the host charging circuit 220 comprises a probe case 230, which may be a probe carrying case or probe storage case. The probe case 230 may have any suitable configuration, but in the example shown in FIG. 18 and FIG. 19 the probe case 230 is shown as comprising a partially hollow rectangular cavity or volume comprising case bottom 232 and four case sidewalls 234. The case bottom 232 and case sidewalls 234 define case interior volume 236, at the bottom of which a case floor 238 is situated. The host inductive charging plate 224 may be below or recessed in the case floor 238 so as to be proximate the butt ends of one or more shaped probes 20(16) which are positioned in case interior volume 236. FIG. 19 shows how plural probes 20(16) may be stored in the case interior volume 236 of probe case 230. It so happens that the probe case 230 of FIG. 19 accommodates three bullet-shaped probes 20(16) which are linearly arranged, but other storage configurations are also possible, with greater numbers of probes and with the probes arranged in other patterns (e.g., two dimensional matrices of probes).

The host charging circuit 220 of the probe case 230 is shown as being connectable, e.g., by power cord 240, to an external power source, e.g., to a source of alternating current. The power cord 240 may be a pronged connector for insertion into an electrical outlet, or of a configuration such as a cigarette charger or USB terminal.

The host charging circuit 220 need not be confined to a probe case 230, but can be situated in other structure such as a compartment of a transport vehicle or the like that is maneuverable near hazard sites. In this regard, the technology disclosed herein encompasses a vehicle for transporting hazard sensor probes which comprises a storage case for chargeable probes, such as illustrated in FIG. 18 and FIG. 19.

From the foregoing it should be appreciated that the butt end 164 of the probe casing 60B facilitates inclusion of inductive charging system, e.g., an inductive charging plate, for re-charging of an internal battery of the bullet-shaped probe 20(16), without having to disassemble of the probe or provide for an open charging port.

From the foregoing it can be appreciated that the internal inductive charging circuit 190 may be situated at an end of the cavity proximate the butt end surface 164 of the casing 60B. Further, the internal inductive charging circuit 190 may comprise an essentially flat inductive charging plate positioned proximate a flat internal wall of the cavity 180, such flat internal wall being perpendicular to the major cylindrical axis of the casing. A thickness of the casing between the butt end surface 164 of the casing and the internal inductive charging circuit 190 is chosen to facilitate both a degree of hazard resistance and to permit inductive charging of the battery by combined operation of (1) an external or host inductive charging circuit (such as host charging circuit 220) positioned proximate the butt end surface 164 but external to the casing and (2) the internal inductive charging circuit 190.

Moreover, the technology disclosed herein encompasses a casing having an exterior surface of any shape which is configured to abut an external inductive charging circuit and thereby permit inductive charging of the chargeable battery by combined operation of the internal inductive charging circuit and the external inductive charging circuit.

The aerodynamic qualities of the shape of the bullet-shaped probe 20(16) of FIG. 15-FIG. 15E and FIG. 16-FIG. 17 also greatly aid in the range at which the probe can be projected, thereby providing increase the distance and associated safety factor for first responder personnel. The probe design greatly assists in guaranteeing a continuous flow of information from the sensor units to the control station without exposing a human to danger or having to depend on pre-located sensors (which might not be correctly situated to provide useful information).

Figures 6A, 6B:
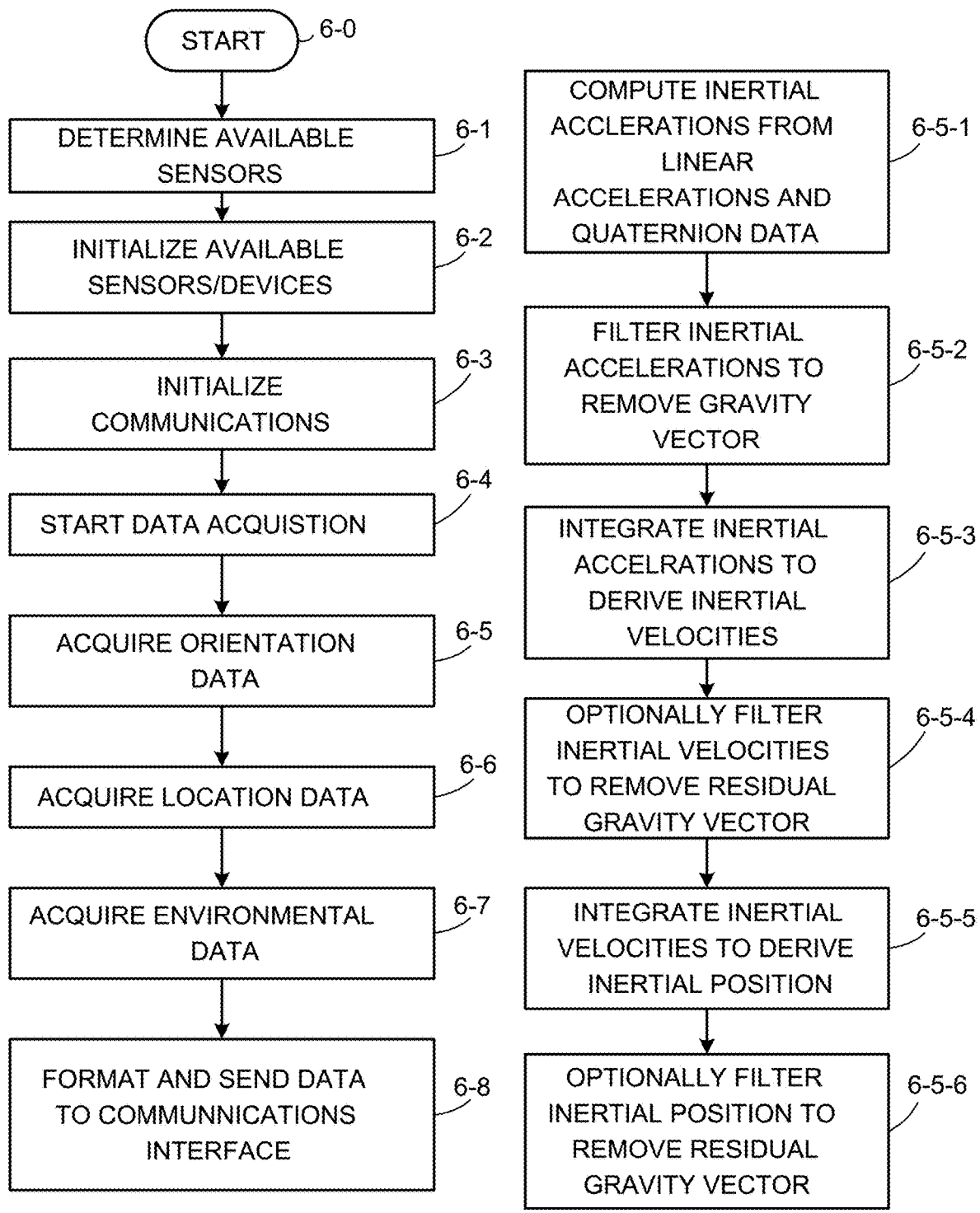
FIG. 6A is a flowchart diagram showing example acts or steps executed by the probe(s) of FIG. 1 in conjunction with a hazard management operation.
FIG. 6B is a flowchart diagram showing example sub-acts or sub-steps executed by the probe(s) of FIG. 1 in conjunction with acquisition of orientation data.

The probe processor circuitry 64 also executes hazard management process 76. The hazard management process 76 comprises coded instructions stored on non-transient medium which, when executed, perform operations such as, for example, coordinating operation of the multiple sensors and the probe communications circuitry 62. Example, representative acts or steps performed by execution of hazard management process 76 are depicted in FIG. 6A. Execution of hazard management process 76 begins with act 6-0, which is followed by execution of act 6-1 through act 6-8. While illustrated in preferable execution order, not all acts of FIG. 6A have to be executed in the order shown.

Act 6-1 comprises determining available sensors, e.g., taking inventory of the particular sensors which have been installed in probe sensor section 68. The determination or inventory may determine, for example, what slots in a sensor board have been occupied with sensors. The identity of the sensors may be determined either based on slot position, or by inquiry to the sensors resulting in a response bearing a sensor type identification.

Act 6-2 comprises initializing the available/inventoried sensors and devices comprising the probe 20. The initialization may be different for each sensor depending on sensor type.

Act 6-3 comprises initializing the probe communications circuitry 62, which may include initializing actual communications between the probe communications circuitry 62 and external communication stations such as hazard communications coordination node 36 and/or base station 42, for example.

Act 6-4 indicates the start of data acquisition. Data acquisition includes act 6-5 (acquisition of orientation data), act 6-6 (acquisition of location data), and act 6-7 (acquisition of environmental data). Act 6-5 is performed to acquire orientation data from orientation sensors 68D-2; act 6-6 is performed to acquire location data from probe disposition sensors 68D-1; act 6-7 is performed to acquire environmental data from one or more probe environmental sensors 68E.

Act 6-8 comprises formatting data obtained from act 6-5 through act 6-7 into a communication packet or frame, and sending the communication packet or frame to the probe communications circuitry 62 so that probe communications circuitry 62 can transmit the communication packet or frame over a radio interface, e.g., to hazard communications coordination node 36 and/or base station 42.

Figure 7:
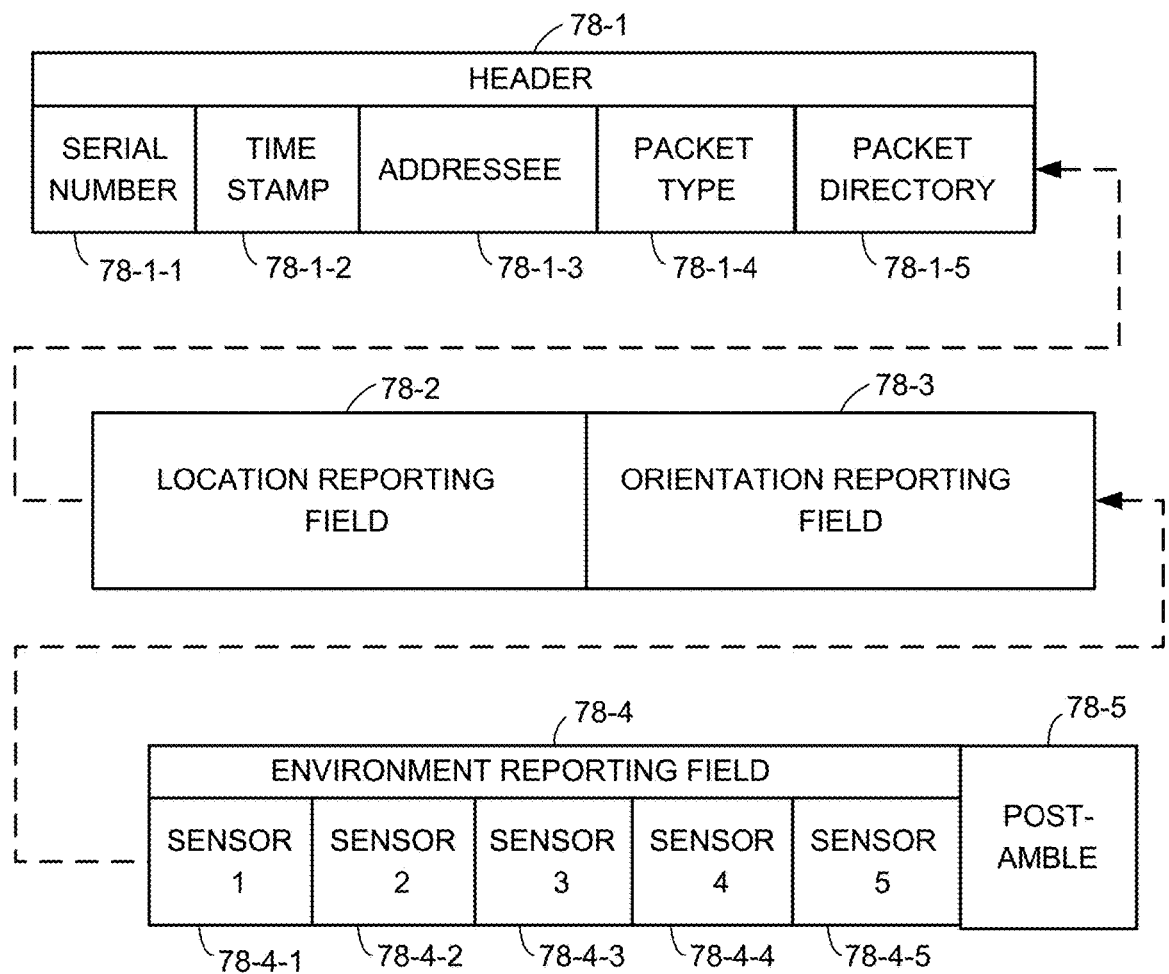
FIG. 7 is a diagrammatic view of an example communication packet or frame prepared by a probe of the hazard management system of FIG. 2.

An example communication packet or frame prepared at act 6-8 is illustrated as packet 78 in FIG. 7. Packet 78 begins with header 78-1 which may include such information as probe identification number or serial number 78-1-1; time stamp 78-1-2; (optionally and if known) an address or identification 78-1-3 of a base station or node to which the packet 78 is to be directed (e.g., to which the packet is addressed); a packet type field 78-1-4; and, a packet directory field 78-1-5. FIG. 7 shows a packet which is identified by packet type field 78-1-4 as being a hazard management reporting packet, and as such indicates what other data reporting fields and sub-fields constitute the packet 78 and the formats (lengths or locations) of those reporting fields and sub-fields. For example, the packet 78 of FIG. 7 comprises location reporting field 78-2 (including data obtained in act 6-6 from location sensor(s) 68D-1); orientation reporting field 78-3 (including data obtained in act 6-5 from orientation sensor(s) 68D-2); and environment reporting field 78-4 (including data obtained in act 6-7 from one or more environmental sensor(s) 68E). For the particular packet 78 shown in FIG. 7, the probe 20 comprises five environmental sensors and thus five sensor reporting data sub-fields 78-4-1 through 78-4-5 are included in the environment reporting field 78-4. The packet 78 may conclude with a post-amble field or trailer 78-5, which may include check information such as a check sum or even error correction information.

Figure 8:
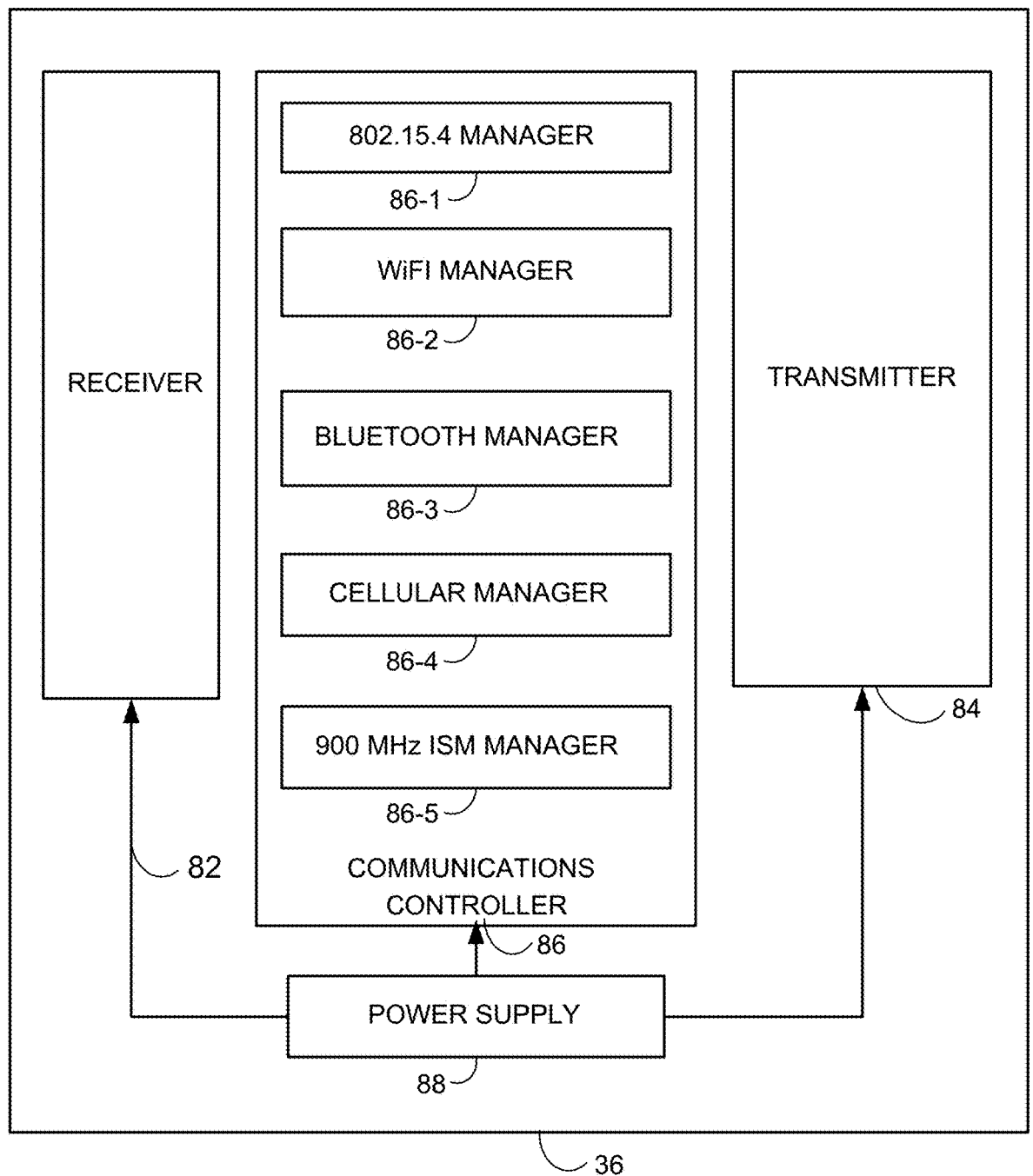
FIG. 8 is a schematic view of a communication module configured to communicate with one or more probes and a hazard management site.

FIG. 8 shows an example embodiment of hazard communications coordination node 36 which is configured to communicate with one or more probes 22 and a hazard management site. In the example embodiment shown in FIG. 8, the hazard communications coordination node 36 comprises node receiver circuitry 82, node transmitter circuitry 84, node communications controller 86, and node power supply 88. The node receiver circuitry 82 comprises, e.g., amplifiers, demodulation circuitry, and other conventional receiver equipment. The node transmitter circuitry 84 includes, e.g., amplifier(s), modulation circuitry and other conventional transmission equipment. The node communications controller 86 may comprise one or more processors or controllers as herein described. The node power supply 88 provides power to each of node receiver circuitry 82, node transmitter circuitry 84, and node communications controller 86.

The node communications controller 86 comprises handlers or managers for one or more types of communication protocol for which the hazard communications coordination node 36 is suited or equipped. A non-exhaustive indication of such protocols is depicted by IEEE 802.15.4 manager 86-1; WiFi manager 86-2, Bluetooth manager 86-3, cellular telecommunications manager 86-4, and 900 MHz Industrial, Scientific, and Medical (ISM) radio access manager 86-5. Other protocols may also be handled by node communications controller 86 for communicating between the probes 22 on the one hand and a hazard management site (whether directly as in the example situation shown in FIG. 2A or through a further telecommunications network(s) and/or internet as shown in the example situation of FIG. 2B.). The hazard communications coordination node 36 receives probe signals from one or more probes 20 and transmits the probe signals to a host device. The hazard communications coordination node 36 may also provide information (e.g., initialization information or other commands) from the host device to probes 20 which are equipped with receivers.

Figure 9:
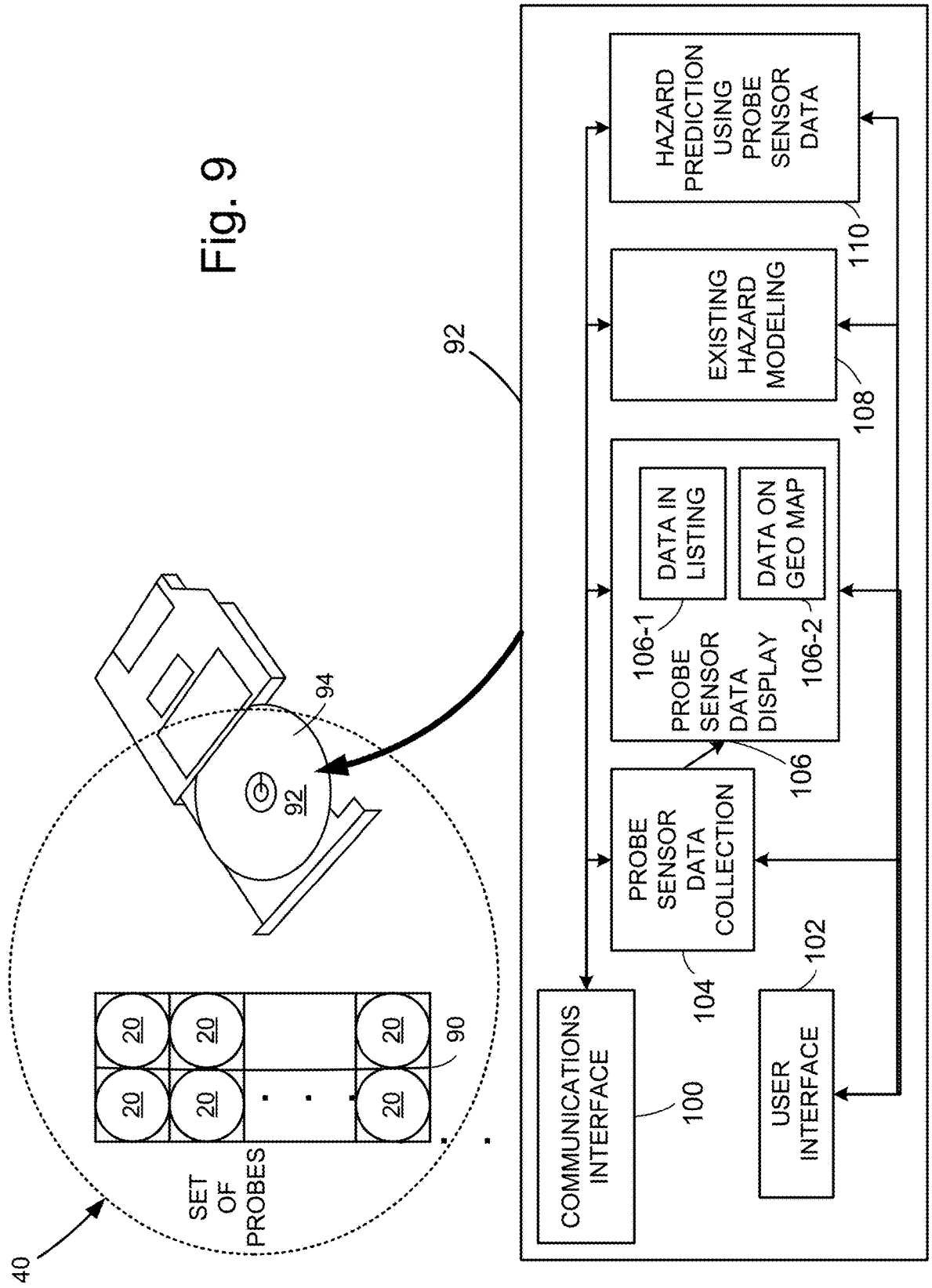
FIG. 9 is a diagrammatic view of a hazard management system comprising a set of probes and a hazard management computer program product.

FIG. 9 shows another perspective of hazard management system 40 as comprising a set 90 of probes 20 and hazard management computer program 92. FIG. 9 shows the set 90 of probes as being stored or organized in pre-deployment configuration in a case or box. The hazard management computer program 92 is also known as a computer program product. The hazard management computer program 92 is configured for execution in conjunction with receipt of the probe signals and comprises instructions stored on non-transient medium. The non-transient medium is illustrated in FIG. 9 as comprising optical or magnetic disk 94, but may be any other suitable non-transient medium. The hazard management computer program 92 comprises instructions which are executed by processor circuitry of a host device. As explained above, the host device may be a computerized device such as a mobile wireless device (illustrated by way of example as laptop 38 in FIG. 2A) or a server such as hazard management server 50 as shown in FIG. 2B. When executed, the instructions of hazard management computer program 92 perform acts including receiving the sensor data included in the probe signal(s) and generating output based on the sensor data included in the probe signal(s).

FIG. 9 further shows an example implementation of hazard management computer program 92, and particularly shows example functional components or modules of the coded instructions of hazard management computer program 92. As shown in FIG. 9 the illustrated example functional modules comprise communication interface 100; user interface 102; probe sensor data collection module 104;

probe sensor data display module 106; existing hazard modeling module 108; and, hazard prediction module 110.

The communication interface 100 is configured to perform communications with at least one of hazard communications coordination node 36 and/or one or more of the probes 20 using any suitable communication protocol, including but not limited to one or more of the following communication technologies: Bluetooth; WiFi; 900 MHz Industrial, Scientific, and Medical (ISM) radio access; cellular radio access; and IEEE 802.15.4.

The user interface 102 receives signals indicative of user input (e.g., manipulation of keyboard, mouse, touch screen, etc.) which serve, e.g., to activate the communication interface 100 and the other modules of hazard management computer program 92. In addition the user interface 102 may output or generate signals through which the user may receive output in any appropriate form, including but not limited to visual, audible, and haptic output, for example.

The probe sensor data collection module 104 is configured to collect and, as necessary and when desired, organize the sensor data included in the probe signal(s) Such sensor data, after collection by options memory 104, may at user instruction or otherwise be displayed on a display apparatus, such as an LCD or other form of display screen, on a host device or a terminal connection to the host device, by operation of probe sensor data display module 106.

Figure 11A:
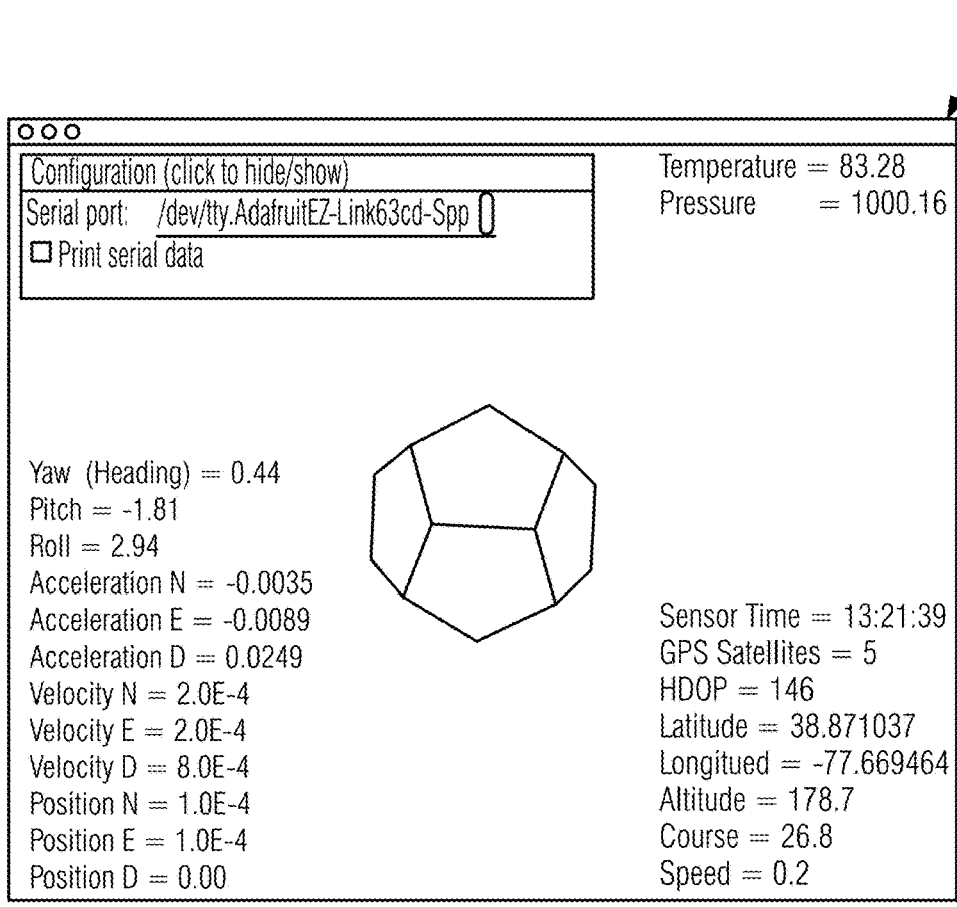
FIG. 11A is a diagrammatic view of a first type of display or screen shot generated by a data processing circuitry of a device that receives data from probe(s) in conjunction with a hazard management operation.

The probe sensor data display module 106 may display probe sensor data in various formats. To this end probe sensor data display module 106 may comprise various types of display driving sub-modules. For example, data display driving sub-module 106-1 is configured to drive a display to show probe sensor data gathered from an individual probe, in the example manner of FIG. 11A. FIG. 11A is depiction of a screen shot 112 driven by data display driving sub-module 106-1, showing an image of a reporting probe along with various data items reported in a probe signal received from the reporting probe. The reporting probe shown in FIG. 11A is an example of a multi-sided (e.g., dodecahedron) shape probe.

Figure 11B:
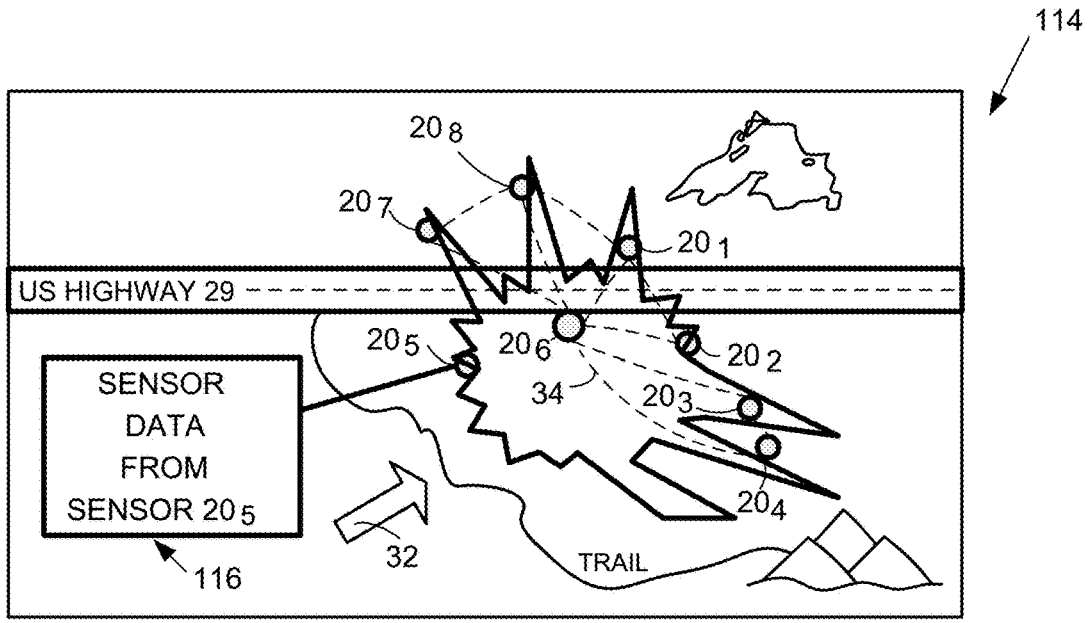
FIG. 11B is a diagrammatic view of a second type of display or screen shot, including visual geographic depiction, generated by a data processing circuitry of a device that receives data from probe(s) in conjunction with a hazard management operation.

As another example, FIG. 11B is a depiction of a screen shot 114 driven by map and data display driving sub-module 106-2. The map and data display driving sub-module 106-2 is configured to drive a display to show probe sensor data in the context of a geographical area of the hazard. That is, the map and data display driving sub-module 106-2 generates a visually perceptible depiction of a geographical area of the hazard in conjunction with the sensor data received in a probe signal. In an example embodiment the geographic depiction may be rendered by, obtained from, or derived from the Geographic Information System (GIS) database 52, which may be either on-board at the host or accessed through the communications interface 100.

By a user input device such as a mouse hovering over and/or clicking on an image of one of the probes 20, an information box 116 showing sensor data obtained from that particular probe 20 appears in the screen. Although not shown in detail in FIG. 11B, the type of information displayed in box 116 for probe $20_5$ in FIG. 11B may be similar to the type of information shown in FIG. 11A. Moreover, the user may edit the instructions for generation of box 116 so that more, less, or other information obtained from the sensor(s) of probe 205 may be displayed.

Figure 11C:
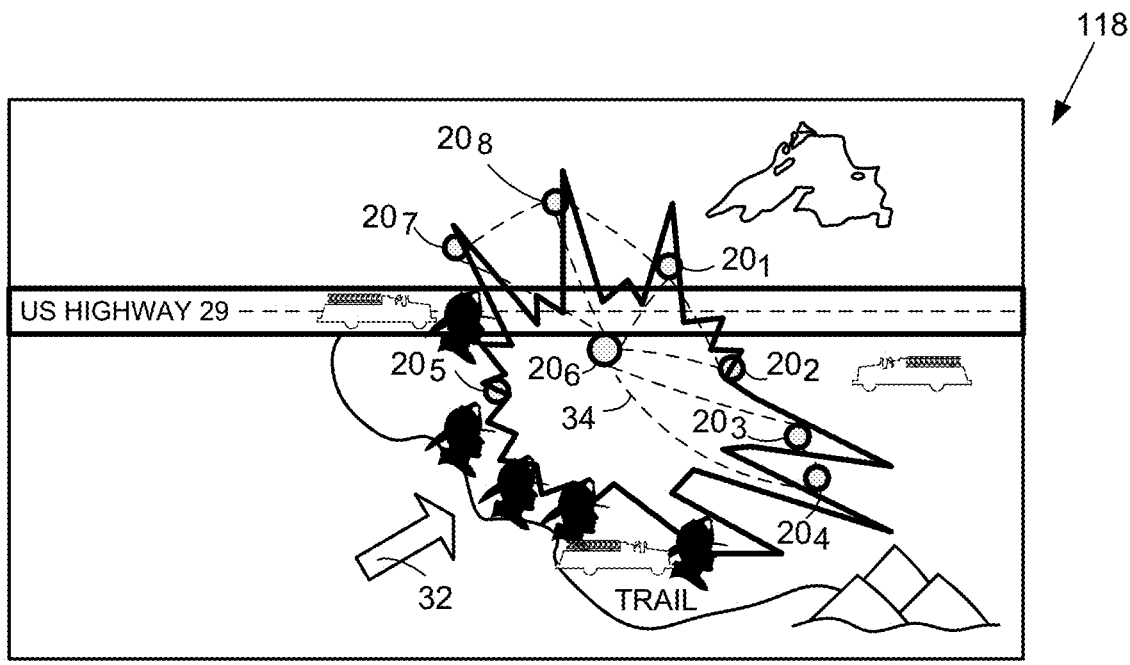
FIG. 11C is a diagrammatic view of a third type of display or screen shot, including hazard modeling information, generated by a data processing circuitry of a device that receives data from probe(s) in conjunction with a hazard management operation.

When executed (e.g., as prompted by user input or automatically as part of a sequence of execution of modules of hazard management computer program 92), the existing hazard modeling module 108 has the capability of consulting hazard modeling application (HMA) 54 and displaying placement of existing hazard management assets, such as position of emergency responder personnel and equipment (e.g., firetrucks). FIG. 11C shows an example display or screen shot 118 generated in conjunction with existing hazard modeling module 108. The locations of emergency responder personnel and equipment may be communicated to the hazard management system 40 and to hazard management computer program 92 in any of various ways, including wireless porting from suitable devices which accompany or are carried by the emergency responder personnel and equipment.

Figure 12:
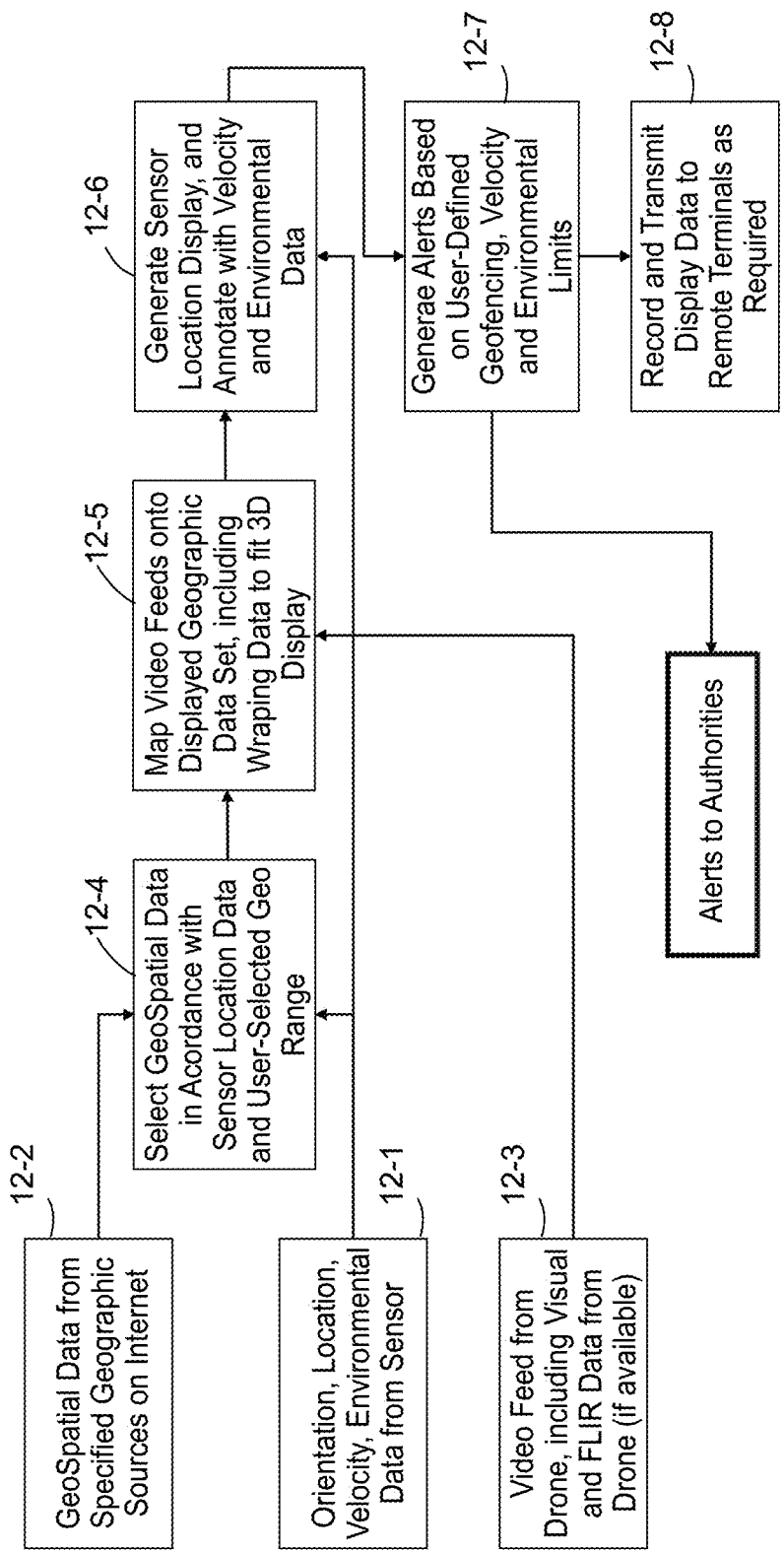
FIG. 12 is a flow-action view showing various example actions performed by an existing hazard modeling module according to an example embodiment and mode.

Further details of the processing and execution of existing hazard modeling module 108 are shown in FIG. 12. FIG. 12 shows existing hazard modeling module 108 performing acts to provide continuous, real-time display and alerting of remote geospatial, sensor location, velocity and environmental data. Act 12-1 comprises existing hazard modeling module 108 gathering orientation, location, velocity, and environmental data from probe(s) 20 (e.g., via probe sensor data collection module 104, for example). Act 12-2 comprises existing hazard modeling module 108 gathering geospatial data from specified geographic sources (e.g., sources on the Internet). Act 12-3 comprises the existing hazard modeling module 108 gathering video data/video feed from video source(s), such as drone 27, the video data/feed comprising (for example) visual and FLIR data.

Act 12-4 comprises the existing hazard modeling module 108 selecting geospatial data (acquired from act 12-2) in accordance with the probe location data and user-selected geo range (acquired from act 12-1). Act 12-5 comprises existing hazard modeling module 108 mapping video feeds/data (acquired from act 12-3) onto the display geographic data set (acquired from act 12-4), including warping data to fit a three dimensional display when necessary. Act 12-6 comprises the existing hazard modeling module 108 generating sensor location display and annotating the sensor location display, e.g., with velocity and/or environmental data. Act 12-7 comprises the existing hazard modeling module 108 generating user alerts based on user-defined limits, such as geo-fencing, velocity, and environmental limits, for example. Act 12-8 comprises recording and transmitting display data to remote terminals as required (using, e.g., communications interface 100).

Figure 11D:
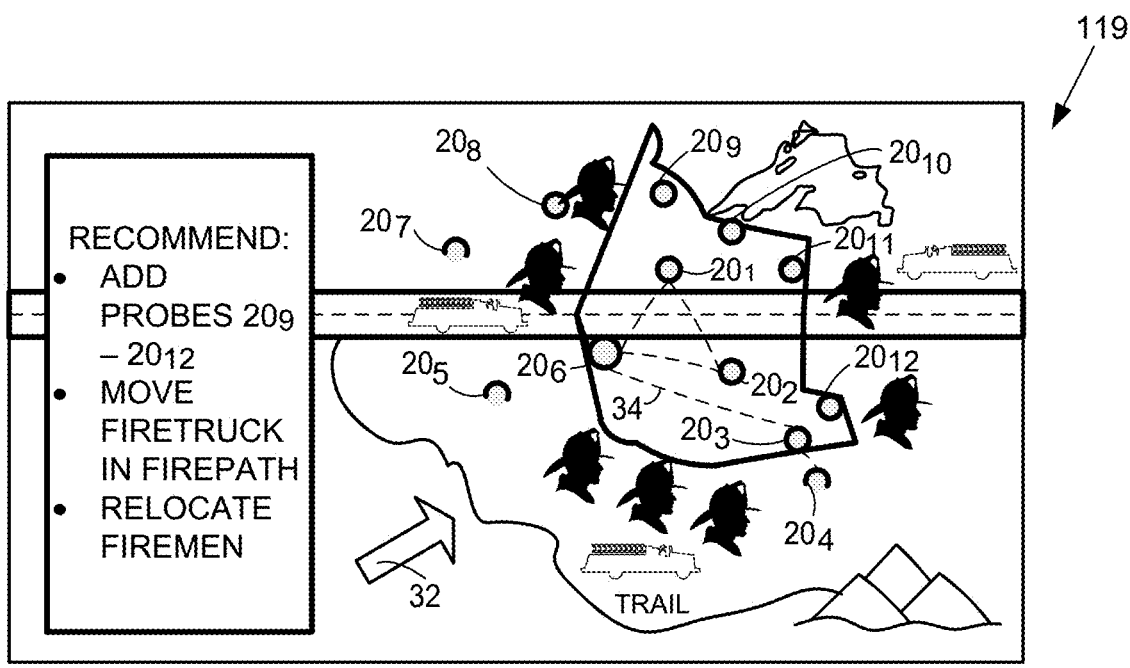
FIG. 11D is a diagrammatic view of a fourth type of display or screen shot, including hazard prediction information, generated by data processing circuitry of a device that receives data from probe(s) in conjunction with a hazard management operation.

When executed (e.g., as prompted by user input or automatically as part of a sequence of execution of modules of hazard management computer program 92), the hazard prediction module 110 uses the sensor data from the probe(s) in conjunction with hazard modeling application (HMA) 54 to predict a potential hazard scenario. For example, a display or screen shot 119 FIG. 11D shows that the hazard prediction module 110 takes into consideration the sensor data to predict that the hazard 22 will assume the shape and location as shown in FIG. 11D. Moreover, the hazard prediction module 110 serves to recommend positions where additional probes (such as probes $20_9$-$20_{12}$) should be deployed, as well as recommended positions to relocate existing assets or add new assets.

Figure 13:
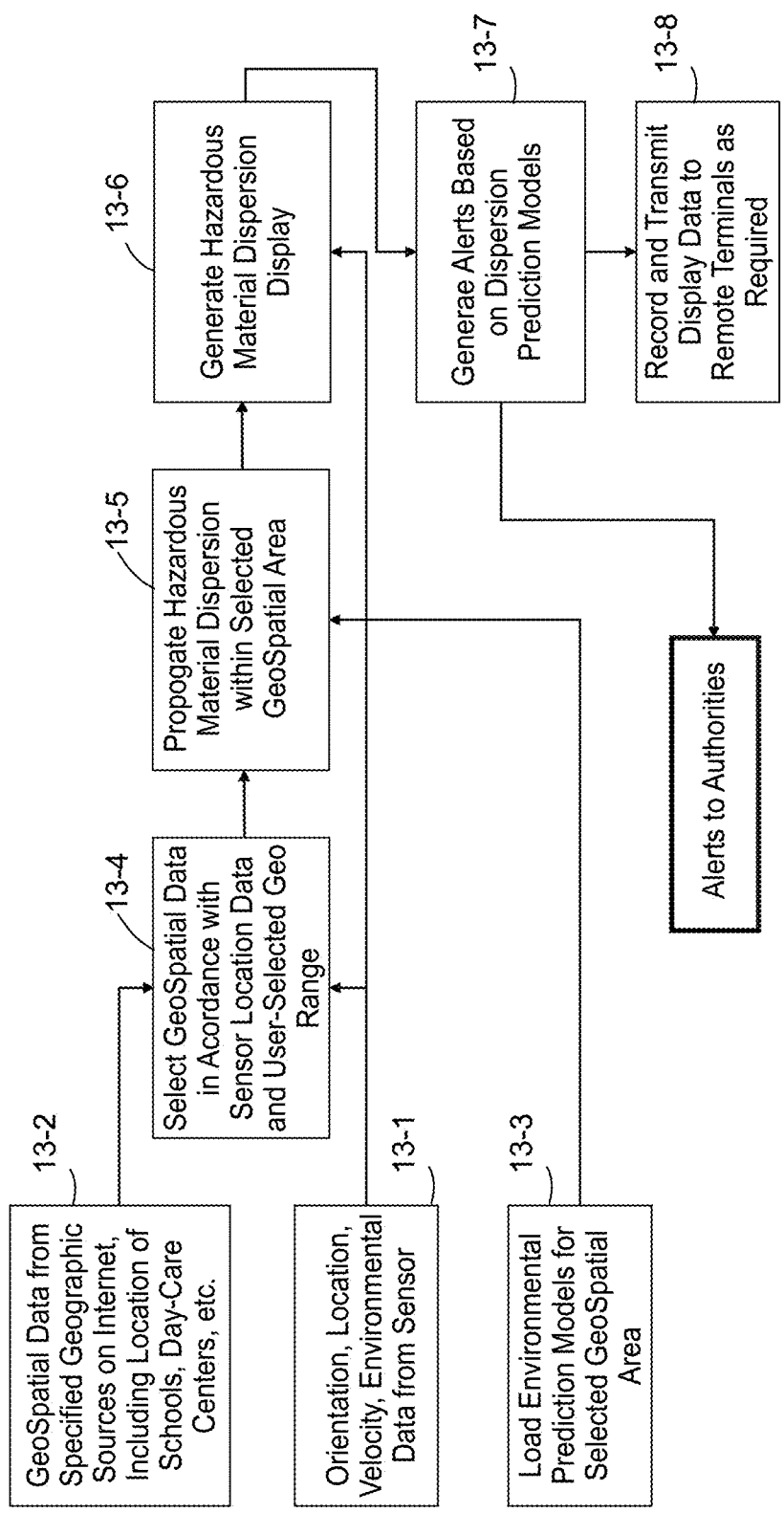
FIG. 13 is a flow-action view showing various example actions performed by a hazard prediction module according to an example embodiment and mode.

Further details of the processing and execution of hazard prediction module 110 are shown in FIG. 13, in an example non-limiting context of hazardous material dispersion. FIG. 13 shows hazard prediction module 110 performing acts to provide continuous hazard prediction and alerting from remote geospatial, sensor location, velocity, and environmental data models. Act 13-1 comprises hazard prediction module 110 gathering orientation, location, velocity, and environmental data from probe(s) 20 (e.g., via probe sensor data collection module 104, for example). Act 13-2 comprises hazard prediction module 110 gathering geospatial data from specified geographic sources (e.g., sources on the Internet). Act 13-3 comprises the hazard prediction module 110 gathering load environmental prediction models for a selected geospatial area.

Act 13-4 comprises the hazard prediction module 110 selecting geospatial data (acquired from act 13-2) in accordance with the probe location data and user-selected geo range (acquired from act 13-1). Act 13-5 comprises hazard prediction module 110 propagating hazardous material dispersion within the selected geospatial area. Act 13-6 comprises the hazard prediction module 110 generating a hazardous material dispersion display. Act 13-7 comprises the hazard prediction module 110 generating user alerts based on dispersion prediction models. Act 13-8 comprises recording and transmitting display data to remote terminals as required (using, e.g., communications interface 100).

Figure 10:
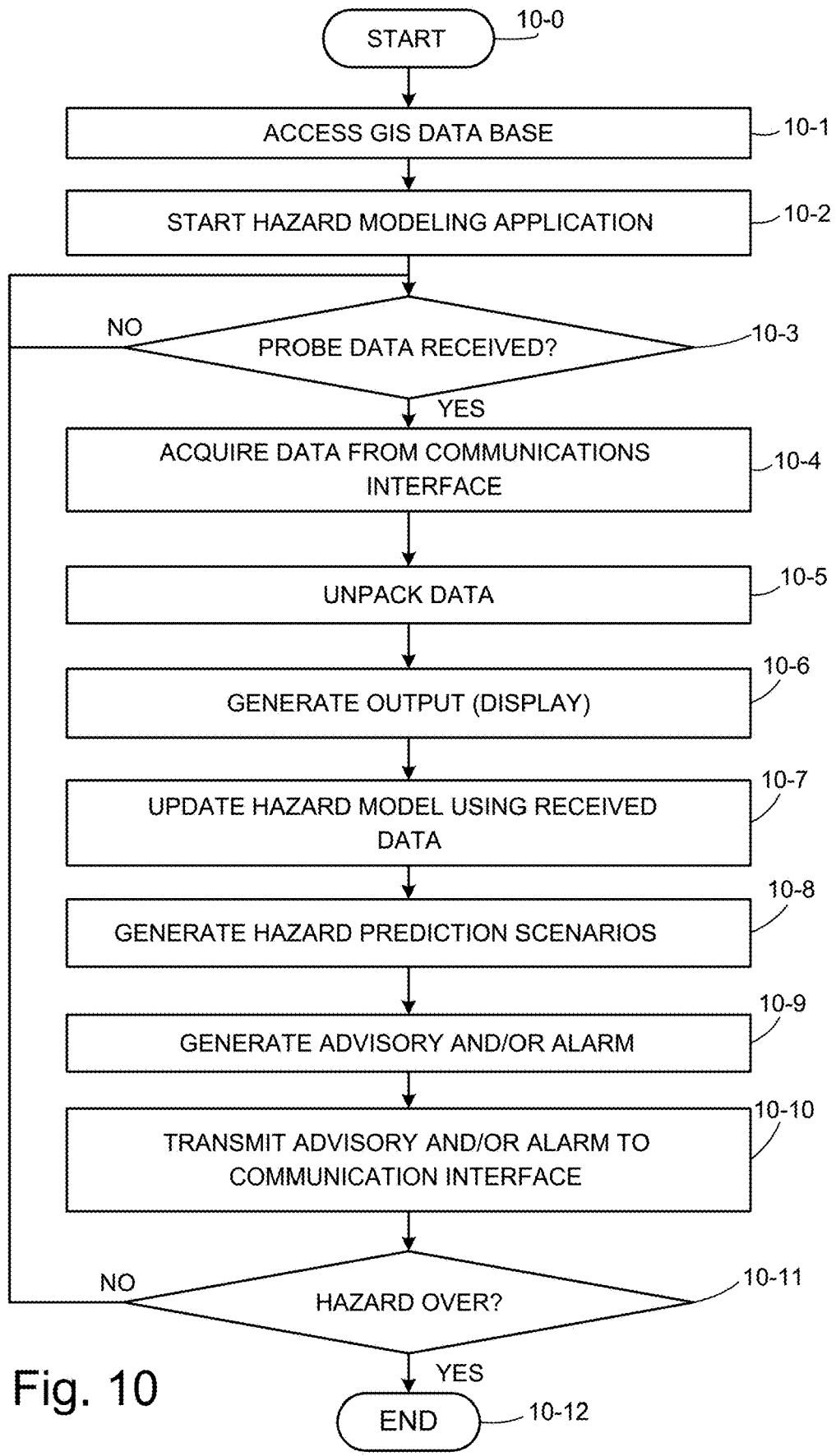
FIG. 10 is a flowchart diagram showing example acts or steps executed by a device that receives data from probe(s) in conjunction with a hazard management operation.

Whereas FIG. 6A shows example acts or steps performed by execution of hazard management process 76 by probe processor circuitry 64, FIG. 10 shows example acts or steps performed in conjunction with a counterpart hazard management process 120 executed by data processing circuitry 130 (see FIG. 14) of a device which is either in communication with one or more probes 20, or which ultimately receives the packet 78 or contents thereof. Such device may be, for example, the emergency response regional center 55, the laptop terminal 56 or the mobile telephone 58, or any other device (e.g., computer workstation) to which the packet 78 is addressed or which has access to packet 78.

The non-limiting example of acts of the hazard management process 120 as shown in FIG. 10 essentially assumes full capability of the hazard management computer program 92 as comprising all modules shown in FIG. 9, including an existing hazard modeling 108 and hazard prediction module 110. It should be understood that, in other example embodiments, all such capabilities (e.g., all such modules) need not necessarily be included or activated.

The hazard management process 120 comprises act 10-1 through 10-12 shown in FIG. 10. Act 10-0 comprises starting and initializing the hazard management process 120 at data processing circuitry 130. Act 10-1 comprises accessing Geographic Information System (GIS) database 52. As known in the art, a Geographic Information System (GIS) 52 database facilitates integration, storage, editing, analysis, sharing, and display of geographic information. The Geographic Information System (GIS) database may be stored or maintained at hazard management server 50, or some other server or database, for access by data processing circuitry 130.

Act 10-2 comprises starting or launching of the hazard modeling application (HMA) 54. In some instances it may be necessary to download or otherwise obtain the hazard modeling application 54 so that the hazard modeling application (HMA) 54 is in memory in data processing circuitry 130. The hazard modeling application (HMA) 54 may be stored or maintained at hazard management server 50, for example, and then downloaded for access to data processing circuitry 130. The hazard modeling application (HMA) 54 is typically configured for a certain type of hazard. For example, there may be one type of hazard modeling application (HMA) 54 for a wildfire, another type of hazard modeling application (HMA) 54 for a building fire, yet another type of hazard modeling application (HMA) 54 for a chemical leak; a further type of hazard modeling application (HMA) 54 for an inclement weather situation, and so on. So the type of hazard modeling application (HMA) 54 activated at act 10-2 may depend on the nature of the hazard.

After the Geographic Information System (GIS) database 52 and hazard modeling application (HMA) 54 are accessed and/or available, the hazard management process 120 is ready to receive reports (e.g., packet 78) from one or more probes 20. Act 10-3 comprises determining if data (e.g., a packet 78) is received from one of the probes 20 comprising the hazard management system 40. If no interrupt or the like indicates receipt of data, the hazard management process 120 continues to await arrival of a first or next packet.

Figure 14:
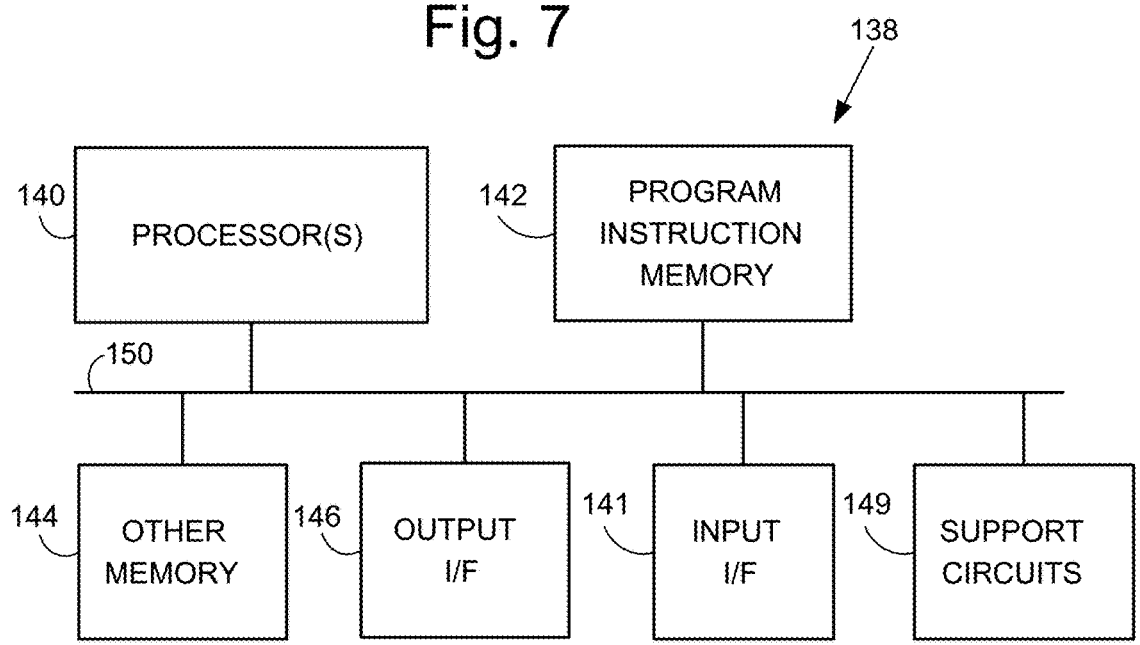
FIG. 14 is a diagrammatic view showing example elements comprising data processing circuitry which may comprise a device that receives data from probe(s) in conjunction with a hazard management operation.

When data is received from a probe 20, as act 10-4 the data processing circuitry 130 of FIG. 14 (e.g., probe sensor data collection module 104) acquires the data (e.g., packet 78) from the communications interface of the receiving device, e.g., from a communications interface of laptop terminal 56 or mobile telephone 58, for example. Act 10-5 comprises unpacking the data from packet 78, e.g., decoding or de-formatting the fields of the packets in order to ascertain the relevant fields of data included in the packet 78. The data included in the packet 78 is understood from the description of FIG. 7, including an identification (e.g., serial number) of the particular probe 20 that transmitted the packet 78, location of the probe 20 (obtained from location reporting field 78-2), orientation of the probe 20 (obtained from orientation reporting filed 78-3), and sensor readings (e.g., obtained from environment reporting field 78-4).

After receiving the data including sensor readings transmitted from a probe 20 in a packet 78, as act 10-6 the data processing circuitry 130 (e.g., probe sensor data display module 106) generates output depicting the contents of the packet 78. The output may take the form of a display such as that depicted by a screen shot 132 shown in FIG. 11, for example. The screen shot 132 may provide information such as an identification (e.g., serial number) of the particular probe 20; location of the probe 20; orientation of the probe 20; and one or more sensor readings obtained by the probe 20. In addition, the information derived from the data processing may be overlaid on the GIS displays described above.

Act 10-7 of the hazard management process 120 comprises updating the hazard modeling application (HMA) 54 using the data received from the probe 20, e.g., the data unpacked at act 10-5 and displayed at act 10-6. Providing the hazard modeling application (HMA) 54 with the additional data provides the hazard modeling application (HMA) 54 with opportunity to perform its automated analysis. Such automated analysis occurs in the context of geographical information provided by Geographic Information System (GIS) database 52, and may result in a further display or mapping of the hazard 22 or strategies sections thereof. The automated analysis may be beneficial in addition to human observation and analysis which also takes into consideration the newly arrived data in conjunction with the existing situation. As will be understood, with repeated execution of the acts of the loop of FIG. 10 upon receipt of information from more and more probes 20, a more detailed overview of the hazard 22 is gained. In fact, as shown by act 10-8, the hazard modeling application (HMA) 54 in conjunction with hazard prediction module 110 may be configured to develop prediction scenarios as shown in FIG. 11D, either on its own volition or as requested by an operator (e.g., of laptop terminal 56 or mobile telephone 58).

As a result of the update and analysis of act 10-7 and/or the scenario prognostication(s) of act 10-8 performed by hazard modeling application (HMA) 54, as act 10-9 an advisory and/or alarm is generated. Act 10-10 illustrates that the advisory and/or alarm may be transmitted to a communication interface of data processing circuitry 130, so that the advisory or alarm may be transmitted (e.g., over radio frequencies or wired connection or both) to other terminals including those in possession of hazard management team members or management personnel, for example.

As indicated by act 10-11, upon completion of the above mentioned acts or periodically the hazard management process 120 checks to see if input has been received to indicate that the hazard management is terminated (e.g., if the hazard is over or under control). If so, as indicated by act 10-12 the hazard management process 120 may terminate. But if the hazard continues, execution loops back to act 10-3 to await arrival of a packet 78 from the same or another probe 20.

FIG. 14 is a diagrammatic view showing example elements comprising data processing circuitry 138 which may comprise some or all of any processor circuitry described herein, including the probe communications circuitry 62, the node communications controller 86, as well as processor circuitry at any host device such as hazard management server 50 or laptop 38, for example. The data processing circuitry 138 of FIG. 14 comprises one or more processors 140, program instruction memory 142; other memory 144 (e.g., RAM, cache, etc.); input/output interfaces 146; peripheral interfaces 148; support circuits 149; and busses 150 for communication between the aforementioned units.

The memory 144, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 149 are coupled to the processors 140 for supporting the processor in a conventional manner. These circuits include cache, power supplies, clock circuits, input/output circuitry and subsystems, and the like.

FIG. 6B shows in more detail certain sub-acts or sub-steps 6-5-1 through 6-5-6 executed by the probe communications circuitry 62 when performing act 6-5, e.g., acquiring orientation data. Act 6-5-1 comprises computing inertial accelerations from linear accelerations and quaternion data. Act 6-5-2 comprises filtering the inertial accelerations to remove a gravity vector. Act 6-5-3 comprises integrating inertial accelerations to derive inertial velocities. Act 6-5-4 comprises optionally filtering inertial velocities to remove the residual gravity vector. Act 6-5-5 comprises integrating the inertial velocities to derive inertial position. Act 6-5-6 comprises optionally filtering inertial position to remove a residual gravity vector.

Thus, upon arrival at a HAZMAT/fire event, e.g., a hazard 22, first responders deploy a combination of multiple micro sensors, e.g., probes 20, and may do so in a pattern such as a constellation. The probes 20 may be deployed using a micro Sensor Ejecting Mechanism (SEM). The SEM may include a drone-based robotic arm, controlled by the operator, and used to drop sensors into specific areas of the hazardous situation. The sensors may also be deployed from a ground-based SEM that is used to "shoot" sensors into the hazardous area by means of a compressed air gun. In addition, the sensors may be deployed from the drone in a tethered manner; that is, they may remain attached to the drone by a thin wire. Deployment of the probes 20 enables initiation of the overall system operation of the hazard management system 40. Once deployed, the probes 20 activate the systems and provide a data stream which is received at hazard management terminals or workstations via the communications network. The communications stream may be essentially continuous. As explained above by way of example, the communications network may be an IEEE 802.15 type network.

The data received from the probes 20, e.g., in packets 78, may be automatically analyzed by the incorporated HAZMAT models (e.g., hazard modeling application (HMA) 54) and overlaid on a local GIS data base (e.g., Geographic Information System (GIS) database 52) to provide the first responder crew a clear picture of the specific hazards and conditions (temperatures, micro weather conditions, chemical, biological, and/or radioactive contamination) [see act 10-7 of FIG. 10]. The display(s) may be operator selectable to focus on the specific mission requirements of that emergency response crew. In addition, the first responder may select a predictive depiction of the possible pathways a spreading conflagration could take to include ground and water path as well as airborne (see, e.g., act 10-8). The end product of this is to allow the first responder to orchestrate their most effective operational plan and safest path to neutralizing the event.

In an alternative embodiment and mode, the emergency response regional center 55 may provide the data via satellite/radio link to a first responder vehicle. This alternative implementation removes the need for the first responder to carry this capability in an already space limited piece of equipment. However, this approach is unable to provide the fidelity of information necessary to effectively understand real world/actual conditions and may entail a safety risk.

The technology disclosed herein may also be used for environmental surveys and may also be programmed to provide tracking of individuals & material equipped with the appropriate micro sensor (e.g., probe 20).

As understood from the foregoing, multiple micro sensors (e.g., probes 20) may be utilized with specific property models (e.g., HAZMAT Substance Model(s) such as hazard modeling application (HMA) 54) for a variety of HAZMAT substances. The hazard modeling application (HMA) 54 may incorporate or be utilized in conjunction with a predictive modeling application (act 10-8) to forecast the spread of the emergency situation. The results of this real time analysis may be displayed (e.g., at emergency response regional center 55, on laptop terminal 56, or on mobile telephone 58, for example), via 802.15.4 mesh network capability. In some instances the laptop terminal 56 may be situated in a vehicle or the like, in which case a Vehicle Mounted RF antenna may be beneficial to ensure adequate connectivity between the responding vehicle and its sensor constellation.

The technology disclosed herein provides numerous capabilities and advantages. For example, it provides the first responder with a clear and concise depiction of the hazards (fire intensity, chemical presence, etc.) and micro environmental conditions associated with the specific emergency event. Other non-limiting and non-exhaustive advantages include:

Real time high fidelity environmental information to first responders

Current sensor will well-characterize "chaotic" wind fields

GPS aided IMU provides sufficient accuracy to measure and report/track velocity and location (current), chemical/substance data (future)

sufficient sensor accuracy to measure vibration/shock/pressure/temperature/humidity The hazard management system 40 may provide standalone analysis and prediction of environmental effects without the need to received inputs from distant command centers. Moreover, the hazard management system 40 provides actionable information directly to the firefighter(s) in the vehicle on a standard laptop or tablet device. Further the hazard management system 40 provides uplink connectivity to local command center (PTAP) to provide analysis of the specific conditions encountered by the responding crew(s). The technology disclosed herein thus introduces and networks disposable micro sensors (e.g., probes 20) into a real time environment by the responding vehicle into a predictive common operating picture and integrates with any existing local sensors.

The technology disclosed herein may enhance: Incident Commander (IC) ability to merge local data bases; Regional Emergency Commander/Coordinator integration into local/community leadership; efforts and investigations of Forensic and Training agencies/departments. Table 1 shows various example performance & capability specifications, e.g., for a probe 20.

TABLE 1

Example Performance & Capability Specifications

| Parameter | Specification |
| --- | --- |
| Heat Tolerance | 400 C., 30 seconds |
| "g" Tolerance | A fall of 200 meters |
| Temperature | +/−5 C. |
| Pressure | +/−10 mbars |
| Power | <150 mah |
| Size (volume) | 65 cm3 |
| Weight | 30 Grams |
| Dimension | 2.5 cm radius |
| Sensitivity (wind speed) | +/−5 kts |
| Sensitivity (combustible gas) | 2500 (+/−1500 ppm) |
| Sensitivity (CO) | 0-200 ppm |
| Sensitivity (HS) | 0-50 ppm |
| Sensitivity (Nuclear) | 1 uR/hr to 1 R/hr |
| GPS Accuracy | +/−10 meters |
| GPS Transmission Mode | 2.4 to 2.485 GHz |
| IMU Accelerometer Sensitivity | 16 g |
| IMU Gyro Sensitivity | 2000 degrees/sec |
| UAV Payload | 1.0 kg |
| UAV Dwell Time | 20 minutes |
| UAV Maximum Altitude | 500 meters |
| UAV Radio Relay | 300 meters |

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and are capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used to provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Although various embodiments have been shown and described in detail, the claims are not limited to any particular embodiment or example. The technology fully encompasses other embodiments which may become apparent to those skilled in the art. None of the above description should be read as implying that any particular element, step, range, or function is essential such that it must be included in the claims scope. The scope of patented subject matter is defined only by the claims. The extent of legal protection is defined by the words recited in the claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC § 112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A probe configured for introduction into a vicinity of a hazard, the probe comprising:
   multiple sensors including at least:
      a sensor configured to acquire disposition information of the probe;
      a sensor configured to acquire environmental information in a vicinity of the probe;
   communications circuitry configured to transmit the disposition information and the environmental information externally to the probe;
   processor circuitry configured to coordinate operation of the multiple sensors and the communications circuitry;
   a casing configured to internally house the multiple sensors, the transmitter, and the processor circuitry, the casing comprising an essentially cylindrical bullet shape, and wherein along a major cylindrical axis a first end of the casing comprises a flat butt surface and a second end of the casing comprises a rounded nose surface;
   wherein the casing base section comprises a three dimensional quadrilateral cavity sized to accommodate the multiple communications sensors, the processing circuitry, and the communications circuitry.

2. The probe of claim 1, wherein the casing is comprised of hazard-hardened material configured to withstand the hazard for at least a predetermined time.

3. The probe of claim 1, wherein the casing is configured to be aerially projected into the hazard.

4. The probe of claim 1, wherein the casing is configured to be transported by a force of the hazard after introduction into the hazard.

5. A probe configured for introduction into a vicinity of a hazard, the probe comprising:
   multiple sensors including at least:
      a sensor configured to acquire disposition information of the probe;
      a sensor configured to acquire environmental information in a vicinity of the probe;
   communications circuitry configured to transmit the disposition information and the environmental information externally to the probe;
   processor circuitry configured to coordinate operation of the multiple sensors and the communications circuitry;
   a casing configured to internally house the multiple sensors, the transmitter, and the processor circuitry, the casing comprising an essentially cylindrical bullet shape, and wherein along a major cylindrical axis a first end of the casing comprises a flat butt surface and a second end of the casing comprises a rounded nose surface;
   wherein the casing comprises a port which accommodates a thermocouple, the thermocouple being connected to the processing circuitry internal to the casing.

6. A probe configured for introduction into a vicinity of a hazard, the probe comprising:
   multiple sensors including at least:
      a sensor configured to acquire disposition information of the probe;
      a sensor configured to acquire environmental information in a vicinity of the probe;
   communications circuitry configured to transmit the disposition information and the environmental information externally to the probe;
   processor circuitry configured to coordinate operation of the multiple sensors and the communications circuitry;
   a casing configured to internally house the multiple sensors, the transmitter, and the processor circuitry, the casing comprising an essentially cylindrical bullet shape, and wherein along a major cylindrical axis a first end of the casing comprises a flat butt surface and a second end of the casing comprises a rounded nose surface;
   a chargeable battery;
   an internal inductive charging circuit electrically coupled to and configured to charge the chargeable battery; and
   wherein the casing comprises an internal three dimensional cavity sized to accommodate at least the rechargeable battery and the internal inductive charging circuit.

7. The probe of claim 6, wherein the internal inductive charging circuit is situated at an end of the cavity proximate the butt end surface of the casing.

8. The probe of claim 7, wherein the internal inductive charging circuit comprises an essentially flat inductive charging plate positioned proximate a flat internal wall of the cavity that is perpendicular to the cylindrical axis of the casing.

9. The probe of claim 7, wherein a thickness of the casing between the butt end surface of the casing and the inductive charging circuit is chosen to facilitate both a degree of hazard resistance and to permit inductive charging of the battery by combined operation of an external inductive charging circuit positioned proximate the butt end surface but external to the casing and the internal inductive charging circuit.

10. A probe configured for introduction into a vicinity of a hazard, the probe comprising:
    multiple sensors including at least:
       a sensor configured to acquire disposition information of the probe;
       a sensor configured to acquire environmental information in a vicinity of the probe;
    communications circuitry configured to transmit the disposition information and the environmental information externally to the probe;
    processor circuitry configured to coordinate operation of the multiple sensors and the communications circuitry;
    a chargeable battery;
    an internal inductive charging circuit electrically coupled to and configured to charge the chargeable battery; and
    a casing configured to internally house the multiple sensors, the transmitter, the processor circuitry, the chargeable battery, and the internal inductive charging circuit; the casing comprising an exterior surface configured to abut an external inductive charging circuit and thereby permit inductive charging of the chargeable battery by combined operation of the internal inductive charging circuit and the external inductive charging circuit, wherein the casing comprises an essentially cylindrical bullet shape, and wherein along a major cylindrical axis a first end of the casing comprises a flat butt surface and a second end of the casing comprises a rounded nose surface, and wherein the exterior surface configured to abut the external inductive charging circuit is the flat butt surface of the casing.

11. The probe of claim 10, wherein the casing comprises an internal three dimensional cavity sized to accommodate at least the rechargeable battery and the internal inductive charging circuit, and wherein the internal inductive charging circuit is situated at an end of the cavity proximate the butt end surface of the casing.

12. The probe of claim 11, wherein the internal inductive charging circuit comprises an essentially flat inductive charging plate positioned proximate a flat internal wall of the cavity that is perpendicular to the cylindrical axis of the casing.

13. The probe of claim 10, wherein a thickness of the casing between the butt end surface of the casing and the inductive charging circuit is chosen to facilitate both a degree of hazard resistance and to permit inductive charging of the battery by the combined operation of the external inductive charging circuit and the internal inductive charging circuit.

14. The probe of claim 10, wherein the casing is comprised of hazard-hardened material configured to withstand the hazard for at least a predetermined time.

15. The probe of claim 10, wherein the casing is configured to be aerially projected into the hazard.

16. The probe of claim 10, wherein the casing is configured to be transported by a force of the hazard after introduction into the hazard.

* * * * *